(12) United States Patent
Hanumanthappa et al.

(10) Patent No.: US 9,654,388 B2
(45) Date of Patent: May 16, 2017

(54) GOAL-BASED NETWORK ROUTING

(71) Applicant: Infinera Corporation, Sunnyvale, CA (US)

(72) Inventors: Jayaram Hanumanthappa, Bangalore (IN); Sudhindra Aithal Kota, Bangalore (IN); Aman Verma, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 15 days.

(21) Appl. No.: 14/587,233

(22) Filed: Dec. 31, 2014

(65) Prior Publication Data
US 2016/0191377 A1   Jun. 30, 2016

(51) Int. Cl.
*H04L 12/721*  (2013.01)
*H04L 12/729*  (2013.01)
*H04L 12/707*  (2013.01)

(52) U.S. Cl.
CPC ............ *H04L 45/34* (2013.01); *H04L 45/124* (2013.01); *H04L 45/125* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 2009/0083374 A1* | 3/2009 | Saint Clair | G05B 15/00 709/203 |
| 2014/0099119 A1* | 4/2014 | Wei | H04J 14/0257 398/79 |
| 2016/0112245 A1* | 4/2016 | Mankovskii | H04L 67/10 709/204 |

* cited by examiner

*Primary Examiner* — Charles C Jiang
*Assistant Examiner* — George Atkins, Jr.
(74) *Attorney, Agent, or Firm* — David Soltz; Harrity & Harrity LLP

(57) ABSTRACT

A device receives network information associated with a network to be planned and including a multiple traffic requirements for the network, and identifies the multiple traffic requirements in the network information. The device allocates a first route in the network for a traffic requirement of the multiple traffic requirements, and determines that a second route for at least one other traffic requirement, of the multiple traffic requirements, is removed based on the route for the traffic requirement. The device allocates a third route in the network for the at least one other traffic requirement, and allocates additional routes in the network for remaining traffic requirements of the multiple traffic requirements. The device generates a network plan for the network based on the first route, the third route, and the additional routes allocated in the network, and outputs or stores the network plan.

20 Claims, 20 Drawing Sheets

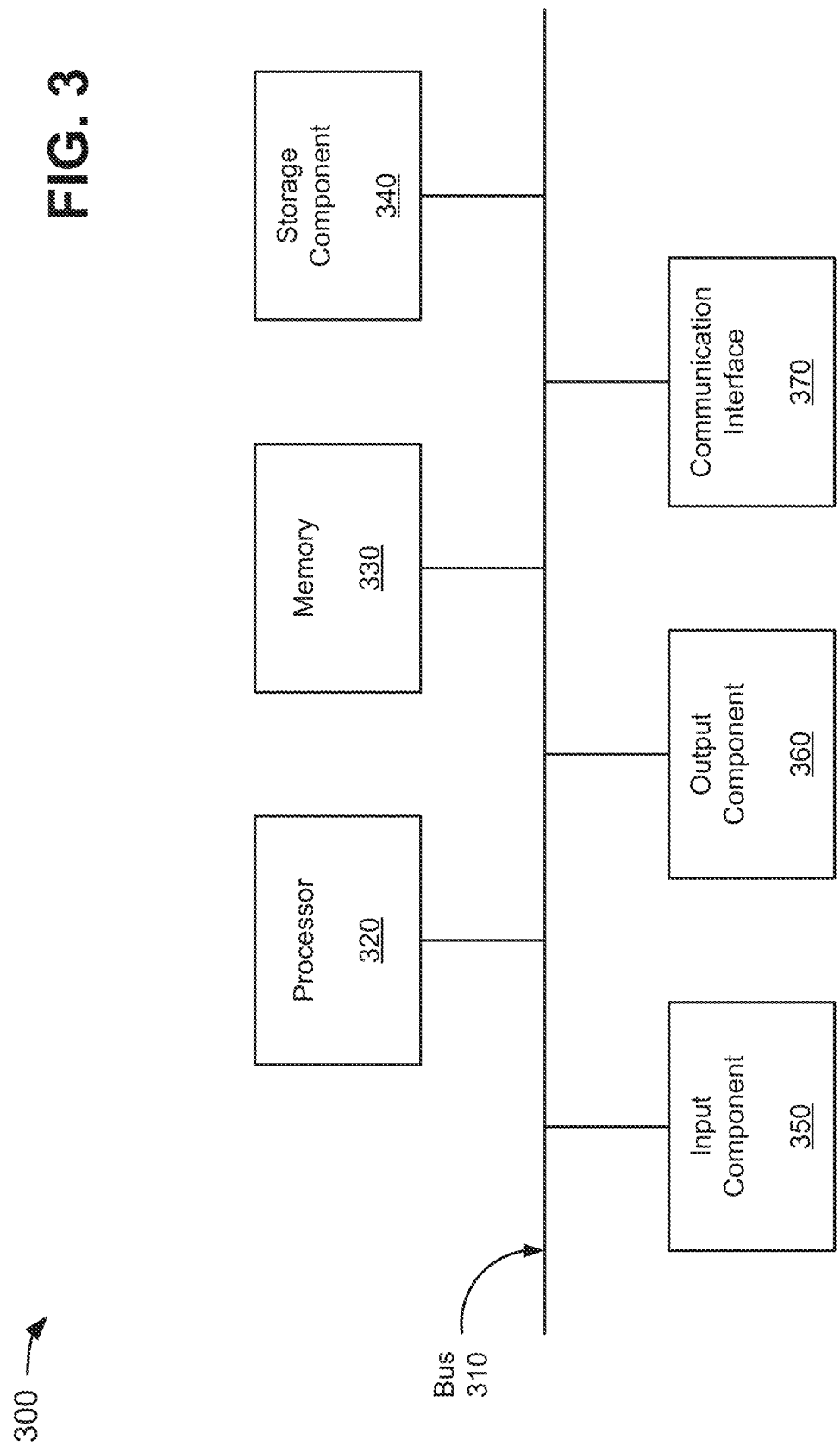

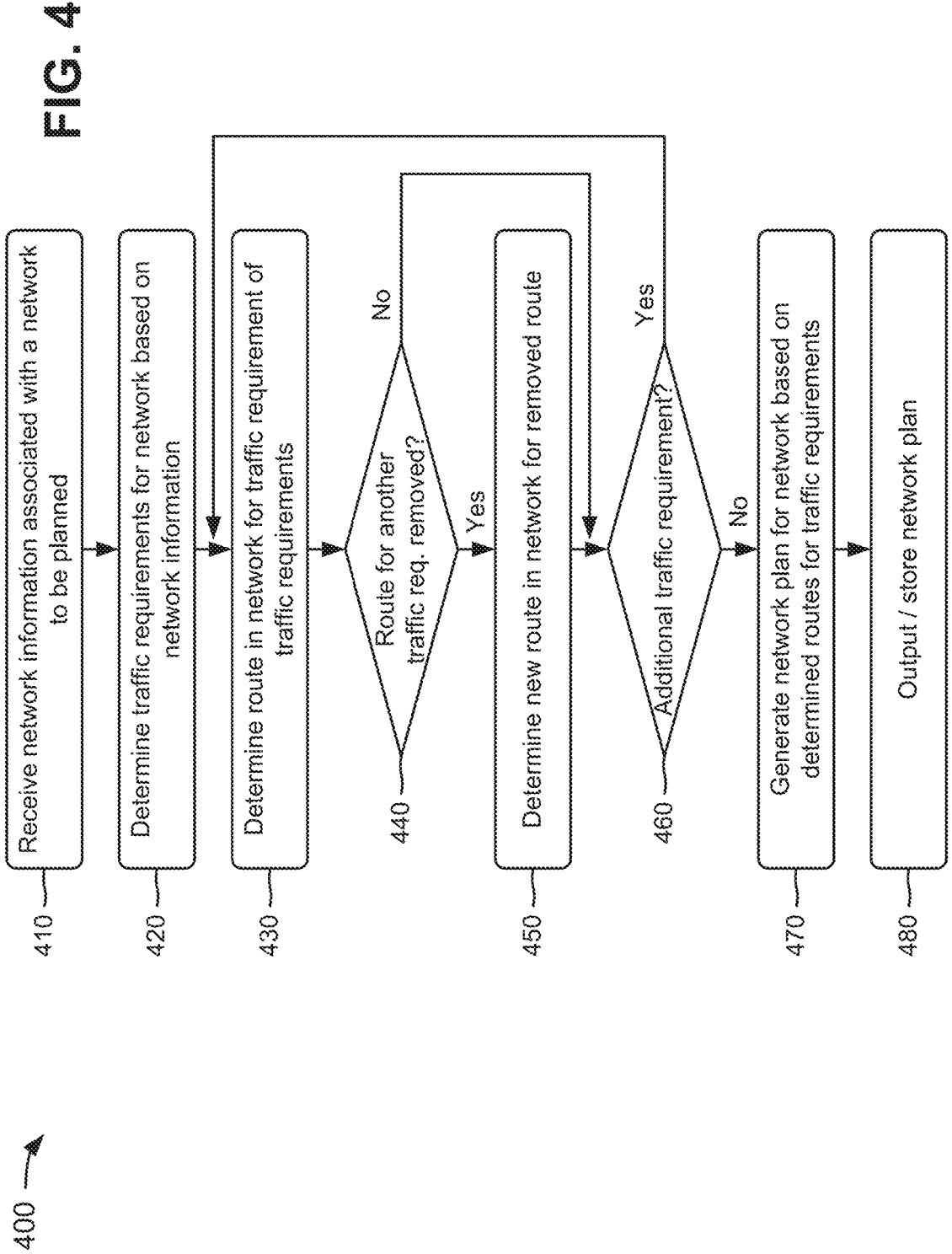

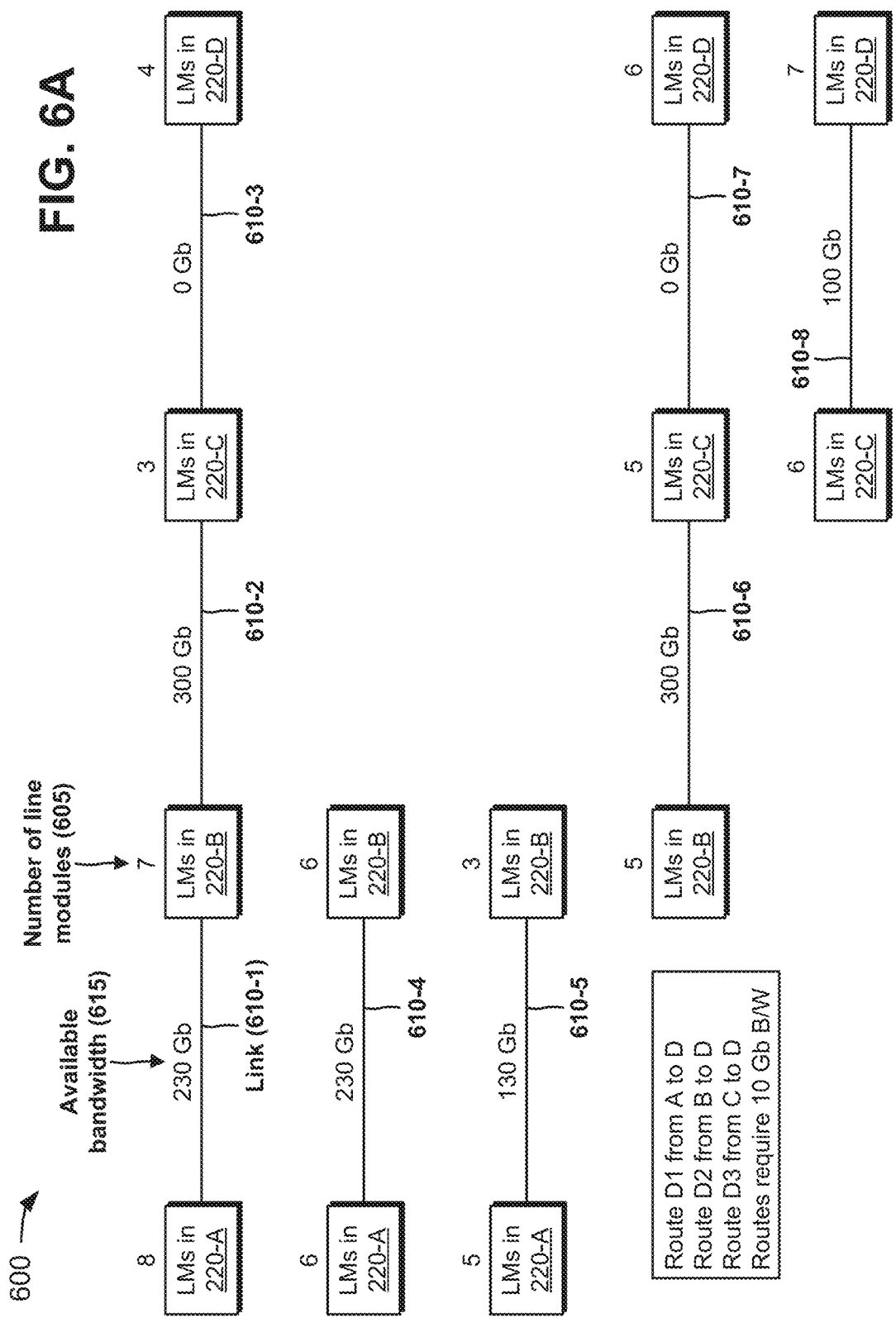

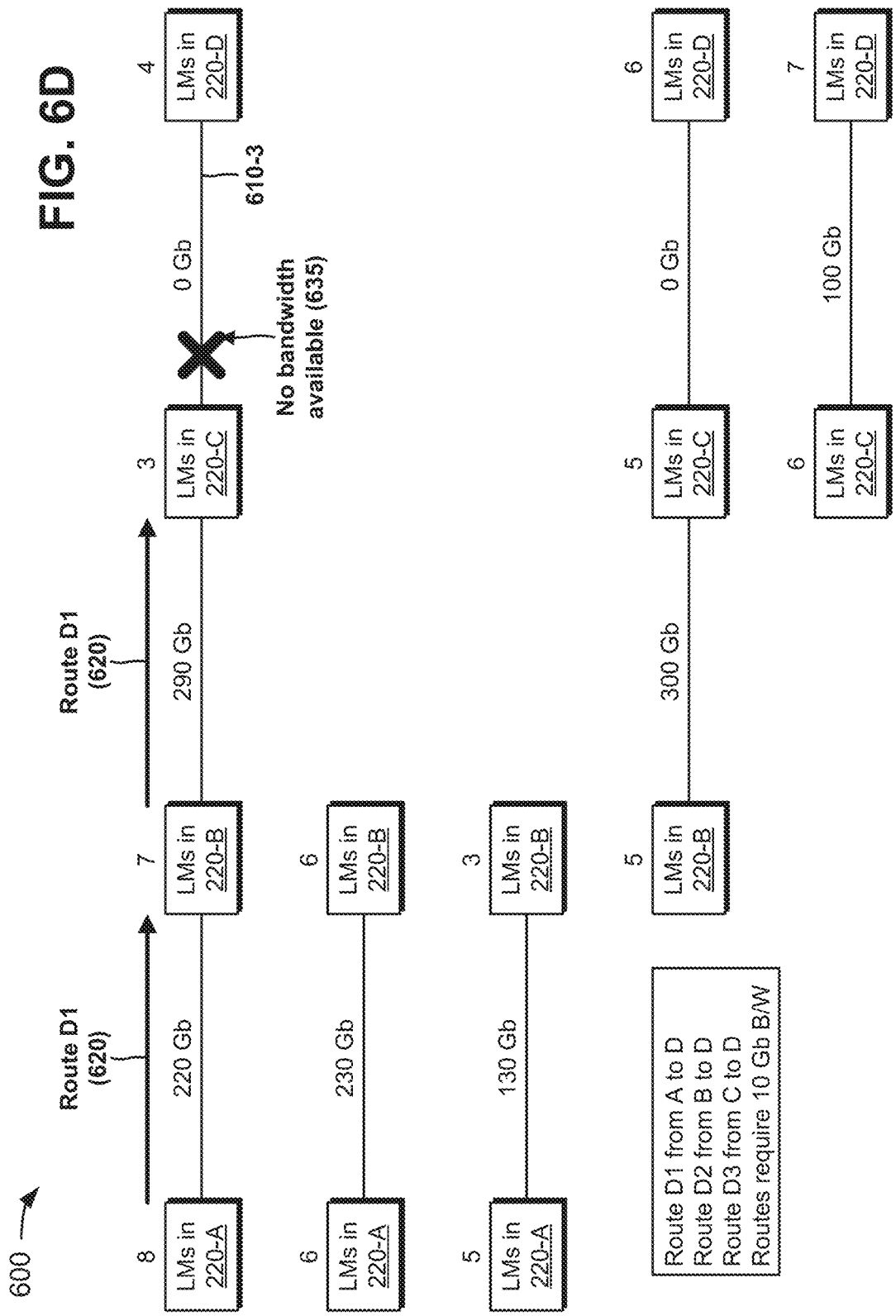

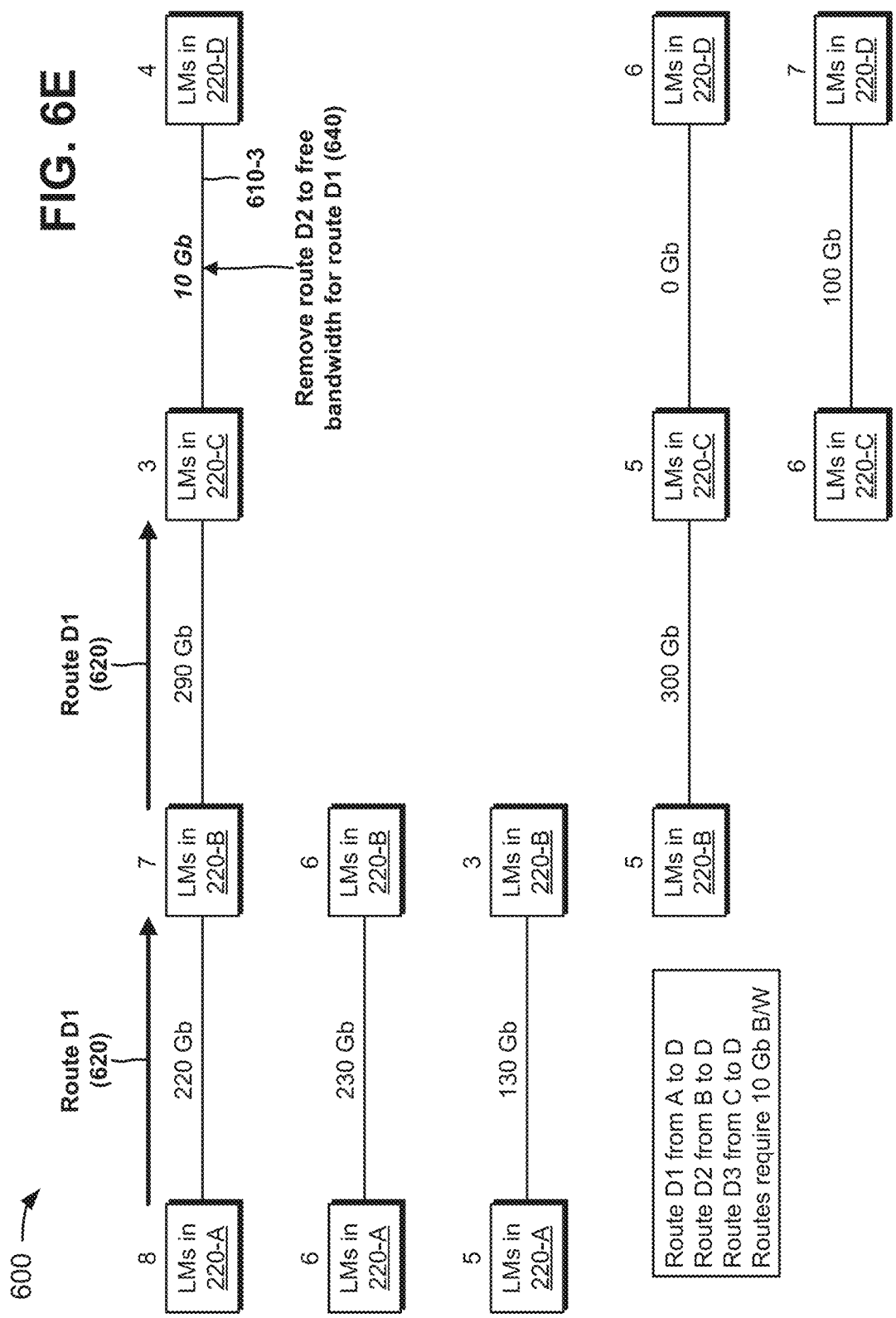

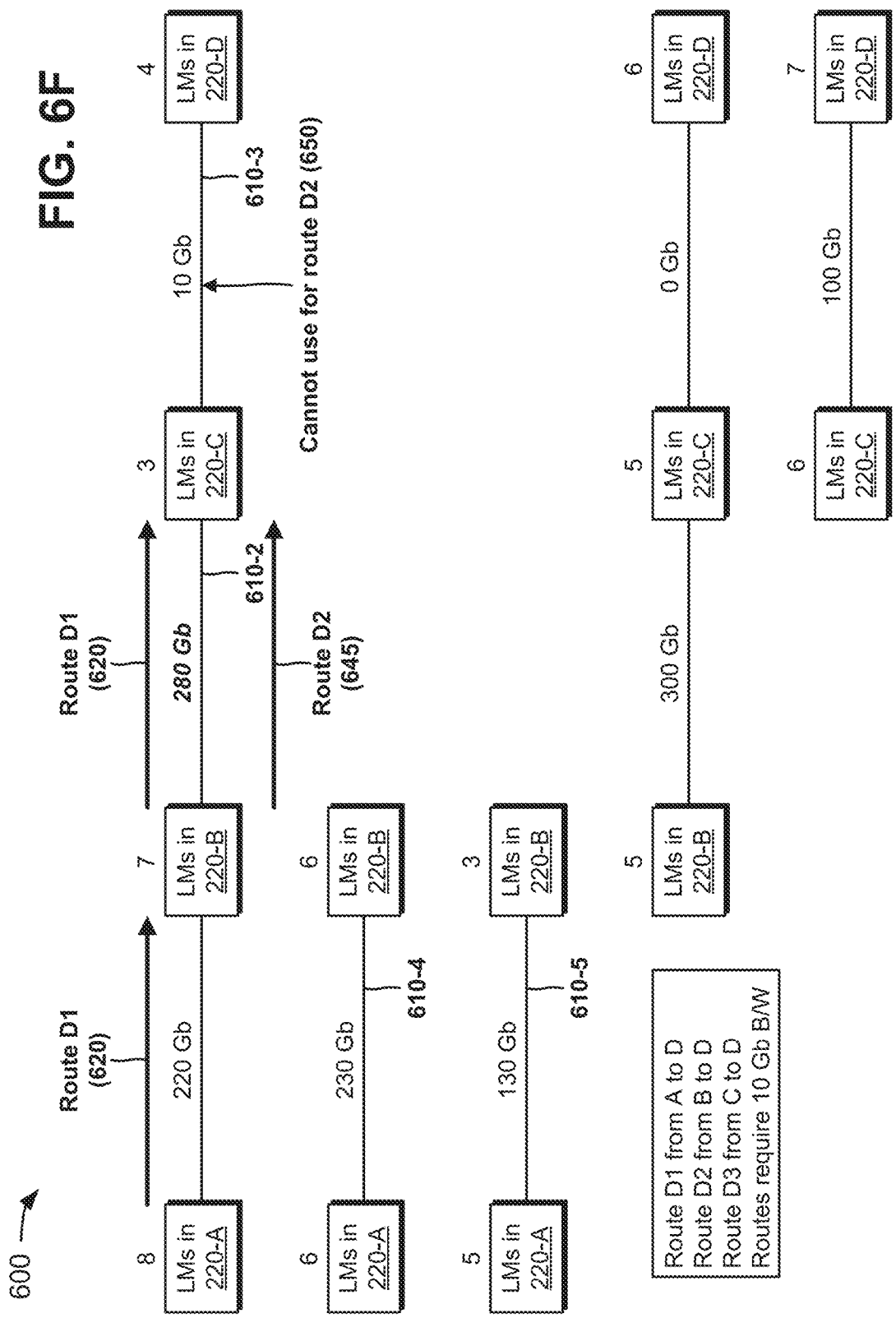

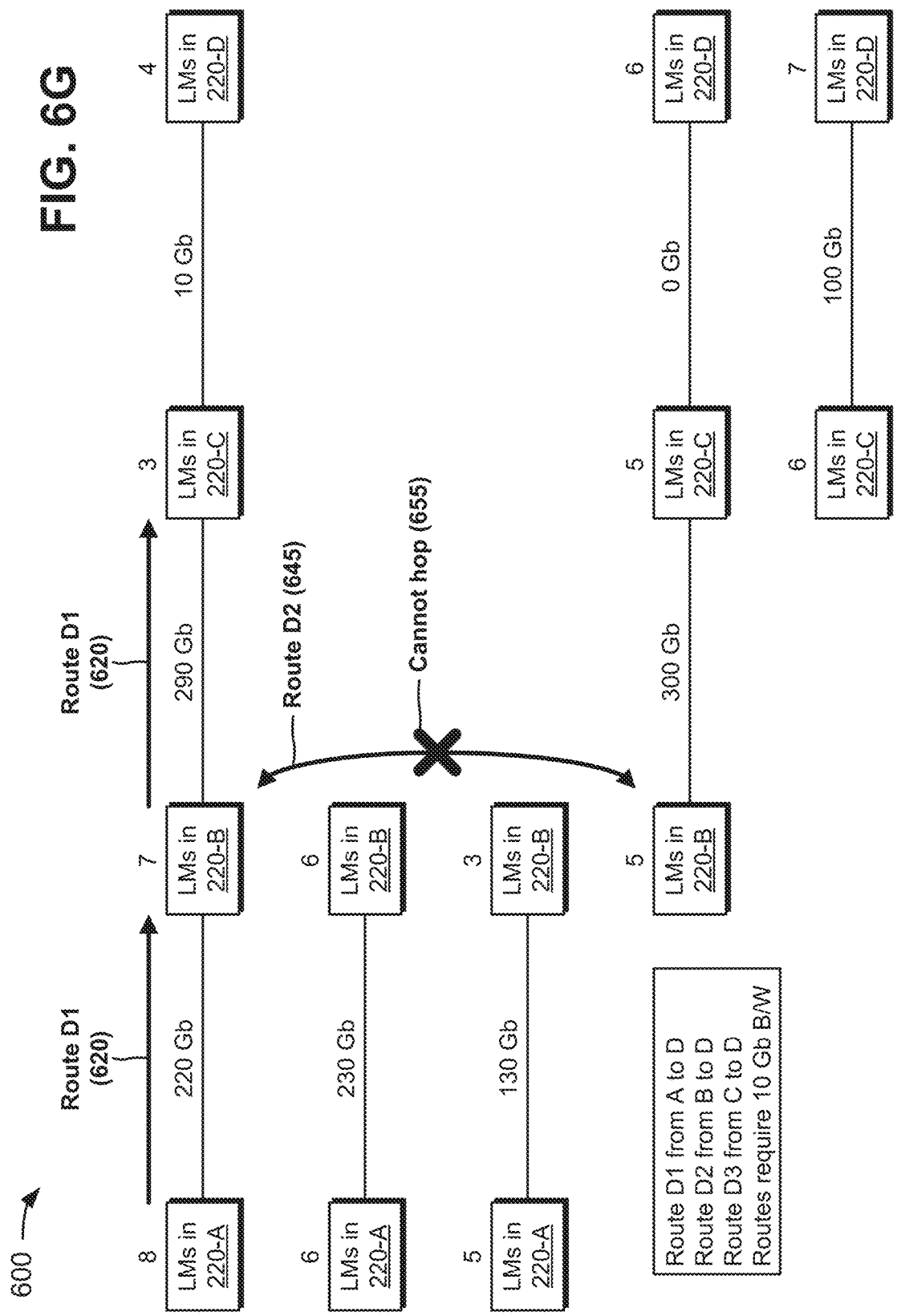

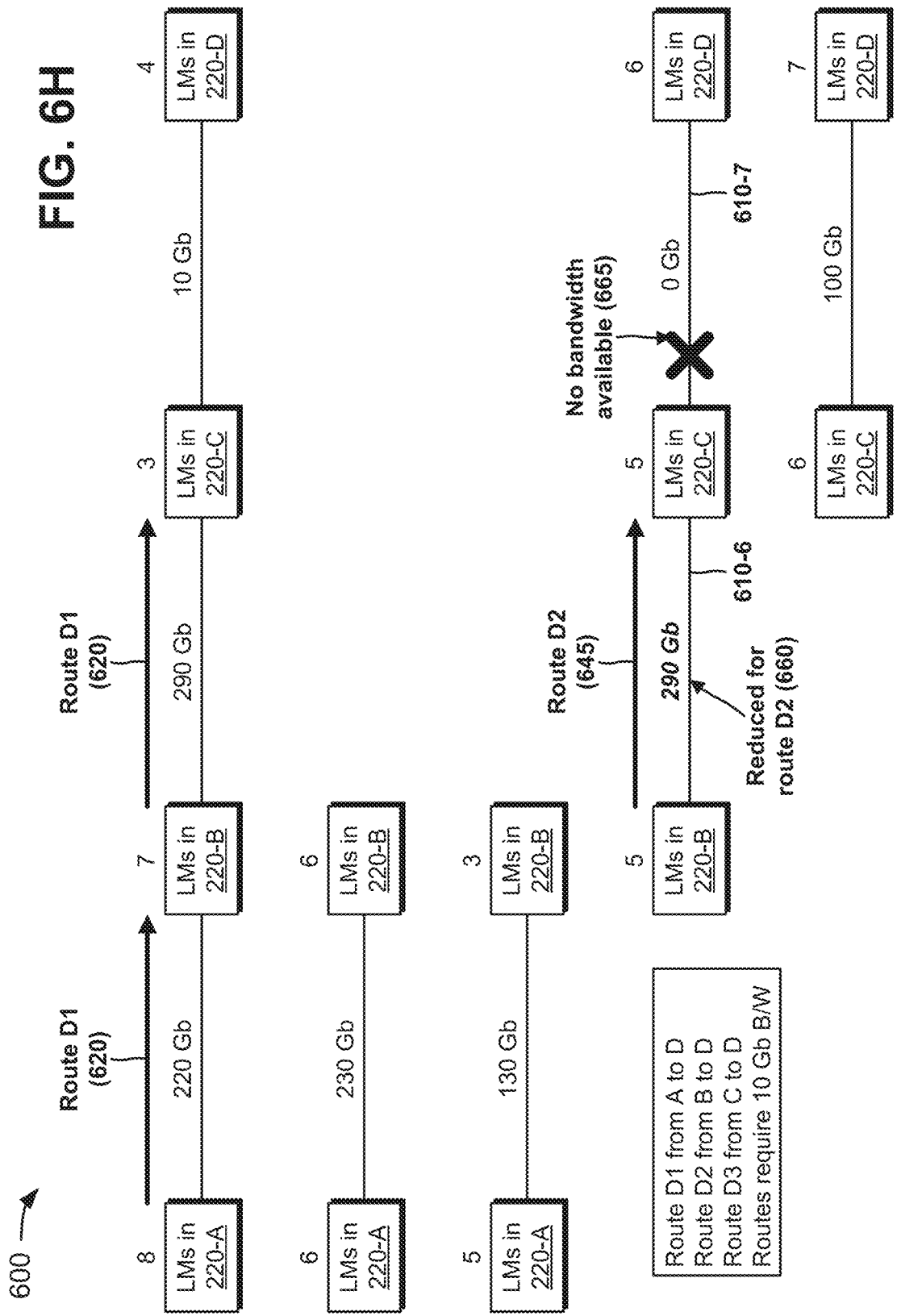

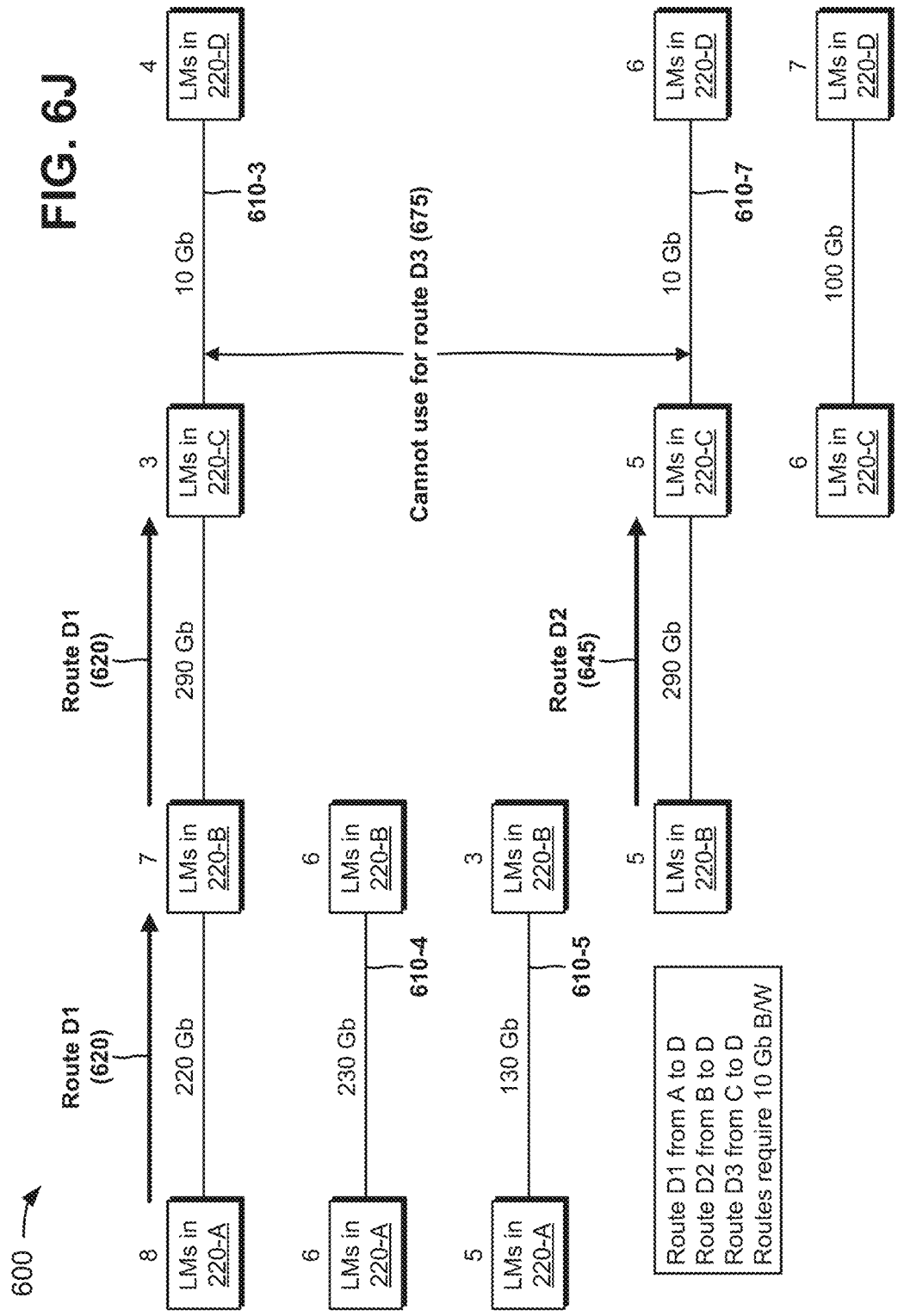

GOAL-BASED NETWORK ROUTING

BACKGROUND

A network planning system enables users to create a plan for a network prior to building the network. The network planning system provides the users with graphical modeling, planning, and configuration capabilities for designing a network. The network planning system attempts to generate a network plan that routes all possible demands (e.g., traffic bandwidth requirements or traffic requirements) of a network using a minimum amount of equipment, such as network devices, line modules, or the like. The network planning system may generate the network plan while simultaneously adhering to routing constraints associated with the network, adhering to rules associated with the network, and ensuring that the network plan is deployable (e.g., realizable).

Generating a network plan may be similar to a bin packing problem or a non-deterministic polynomial-time (NP)-hard problem. In a bin packing problem, objects of different volumes may be packed into a finite number of bins or containers, each of a particular volume, in a way that minimizes the number of bins used. A problem "H" may be considered a NP-hard problem when every problem "L" in non-deterministic polynomial-time can be reduced in polynomial time to problem "H." A bin packing problem may be solved using a bin-packing algorithm, such as, for example, two-dimensional packing, linear packing, packing by weight, packing by cost, or the like.

SUMMARY

According to some possible implementations, a method may include receiving, by a device, network information associated with a network to be planned and including multiple traffic requirements for the network. The method may include identifying, by the device, the multiple traffic requirements in the network information, and determining, by the device, a first route in the network for a first traffic requirement of the multiple traffic requirements. The method may include determining, by the device, that a second route for a second traffic requirement, of the multiple traffic requirements, is removed based on the first route for the first traffic requirement, and determining, by the device, a third route in the network for the second traffic requirement. The method may include determining, by the device, additional routes in the network for remaining traffic requirements of the multiple traffic requirements, generating, by the device, a network plan for the network based on the first route, the third route, and the additional routes determined in the network; and outputting, by the device, the network plan.

According to some possible implementations, a device may include one or more processors to: receive network information associated with a network to be planned and including multiple traffic requirements for the network; and identify the multiple traffic requirements in the network information. The one or more processors are further to allocate a first route in the network for a traffic requirement of the multiple traffic requirements; and determine that a second route for at least one other traffic requirement, of the multiple traffic requirements, is removed based on the route for the traffic requirement. The one or more processors are further to allocate a third route in the network for the at least one other traffic requirement; and allocate additional routes in the network for remaining traffic requirements of the multiple traffic requirements. The one or more processors are further to generate a network plan for the network based on the first route, the third route, and the additional routes allocated in the network; and output or store the network plan.

According to some possible implementations, a computer-readable medium for storing instructions, the instructions may include one or more instructions that, when executed by one or more processors of a device, cause the one or more processors to: receive network information associated with a network to be planned and including multiple traffic requirements for the network; identify the multiple traffic requirements in the network information; determine a first route in the network for a first traffic requirement of the multiple traffic requirements; determine that a second route for a second traffic requirement, of the multiple traffic requirements, is removed based on the route for the first traffic requirement; determine a third route in the network for the second traffic requirement; determine that a fourth route for a third traffic requirement, of the multiple traffic requirements, is removed based on the first route for the second traffic requirement; determine a fifth route in the network for the third traffic requirement; determine additional routes in the network for remaining traffic requirements of the multiple traffic requirements; generate a network plan for the network based on the first route, the third route, the fifth route, and the additional routes determined in the network; and output or store the network plan.

BRIEF DESCRIPTION OF THE DRAWINGS

FIG. 3 is a diagram of example components of one or more devices of FIG. 2;

FIG. 4 is a flow chart of an example process for generating a network plan utilizing goal-based network routing;

FIGS. 6A-6L are diagrams of an example implementation relating to the example process shown in FIG. 4.

DETAILED DESCRIPTION

The following detailed description refers to the accompanying drawings. The same reference numbers in different drawings may identify the same or similar elements.

Generating a network plan that includes a minimum amount of equipment (e.g., network devices, line modules, or the like) is similar to the bin packing problem, but with a lot more constraints, such as equipment size restrictions, express optimizations, diversity constraints, protection constraints, or the like. Some network planning systems generate a network plan by ordering demands (e.g., traffic requirements) to be placed on the network, and a final network plan may depend on the demand ordering (e.g., which is similar to a bin packing problem). However, some demand orderings generate suboptimal network plans and, for some networks, no demand ordering will generate an optimal network plan. For example, a network with two-hundred (200) traffic requirements may generate $8 \times 10^{374}$ different network plans, and it is impossible to test all of the network plans. Once a network planning system routes traffic requirements in a network, the traffic requirements cannot be unallocated a route and reallocated a new. Furthermore, the network planning system assumes that equipment and/or portions of equipment (e.g., slots for line modules) are fixed.

Systems and/or methods, described herein, may provide a network planning system that utilizes goal-based routing to generate a network plan. The network planning system may remove a route for a previously routed traffic requirement in order to route a new or current traffic requirement, and may then establish a goal of determining a new route for the removed route. The determination of the new route may further remove routes for additional traffic requirements, and the network planning system may establish additional goals of determining new routes for the additional traffic requirements until routes are determined for all of the traffic requirements. The network planning system may assume that equipment and/or portions of equipment are not fixed in place (e.g., slots for line modules are not fixed and finalized).

Figure 1:
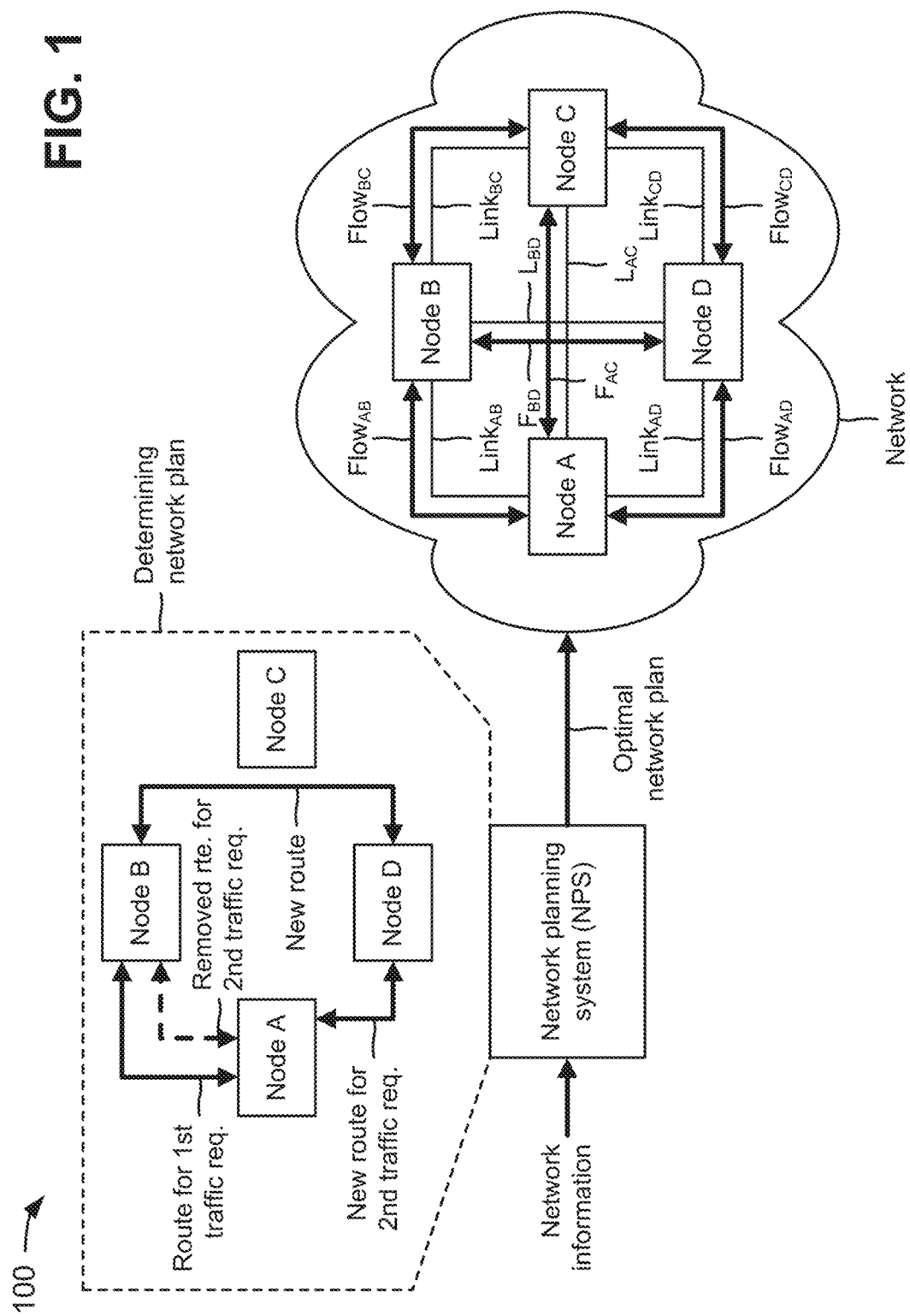
FIG. 1 is a diagram of an overview of an example implementation described herein.

FIG. 1 is a diagram of an overview of an example implementation 100 described herein. As shown, a network planning system (NPS) may receive network information associated with a network to be planned by the NPS. The network information may include information associated with nodes of the network (e.g., sizes of the nodes, physical locations of the nodes, addresses of the nodes, a number of line modules in the nodes, or the like); information associated with connectivity (e.g., links) between the nodes; information associated with traffic requirements between the nodes (e.g., in some instances referred to herein as "flows"); or the like. Each node may include a device capable of receiving, transmitting, processing, routing, etc., traffic travelling via the network, such as, for example, a router, a switch, a gateway, a modem, a firewall, or the like.

As further shown in FIG. 1, the NPS may determine traffic requirements for the network based on the network information, and may determine a route (e.g., between Node A and Node B) in the network for a first traffic requirement of the traffic requirements. If the route for the first traffic requirement removes a route (e.g., between Node A and Node B) for a second traffic requirement, the NPS may determine a new route (e.g., between Node A and Node B, via Node D) in the network for the second traffic requirement. In some implementations, the route for the second traffic requirement may remain the same (e.g., between Node A and Node B), but may be allocated via a different set(s) of line modules of Node A and Node B. The NPS may determine routes for other traffic requirements of the traffic requirements, and may continue this process until all of the traffic requirements are routed in the network. Once all of the traffic requirements are routed in the network, the NPS may generate an optimal network plan for the network based on the determined routes for the traffic requirements. The NPS may output (e.g., provide for display) and/or store the optimal network plan. In some implementations, the optimal network plan may minimize equipment (e.g., line modules) required to construct the network.

As further shown in FIG. 1, the optimal network plan may be utilized by a customer to physically create the network. For example, the customer may utilize the optimal network plan to build a network that includes four nodes (e.g., Node A, Node B, Node C, and Node D) interconnected by six links (e.g., $Link_{AB}$, $Link_{BC}$, $Link_{CD}$, $Link_{AD}$, $Link_{BD}$, and $Link_{AC}$). The determined routes for the traffic requirements between the four nodes are shown as six flows (e.g., $Flow_{AB}$, $Flow_{BC}$, $Flow_{CD}$, $Flow_{AD}$, $Flow_{BD}$, and $Flow_{AC}$).

Systems and/or methods, described herein, may provide a network planning system that utilizes goal-based routing to quickly generate a network plan. The systems and/or methods may not utilize an initial demand (e.g., a traffic requirement) ordering for the network plan, and may determine routes for demands that experience problems (e.g., insufficient bandwidth).

Figure 2:
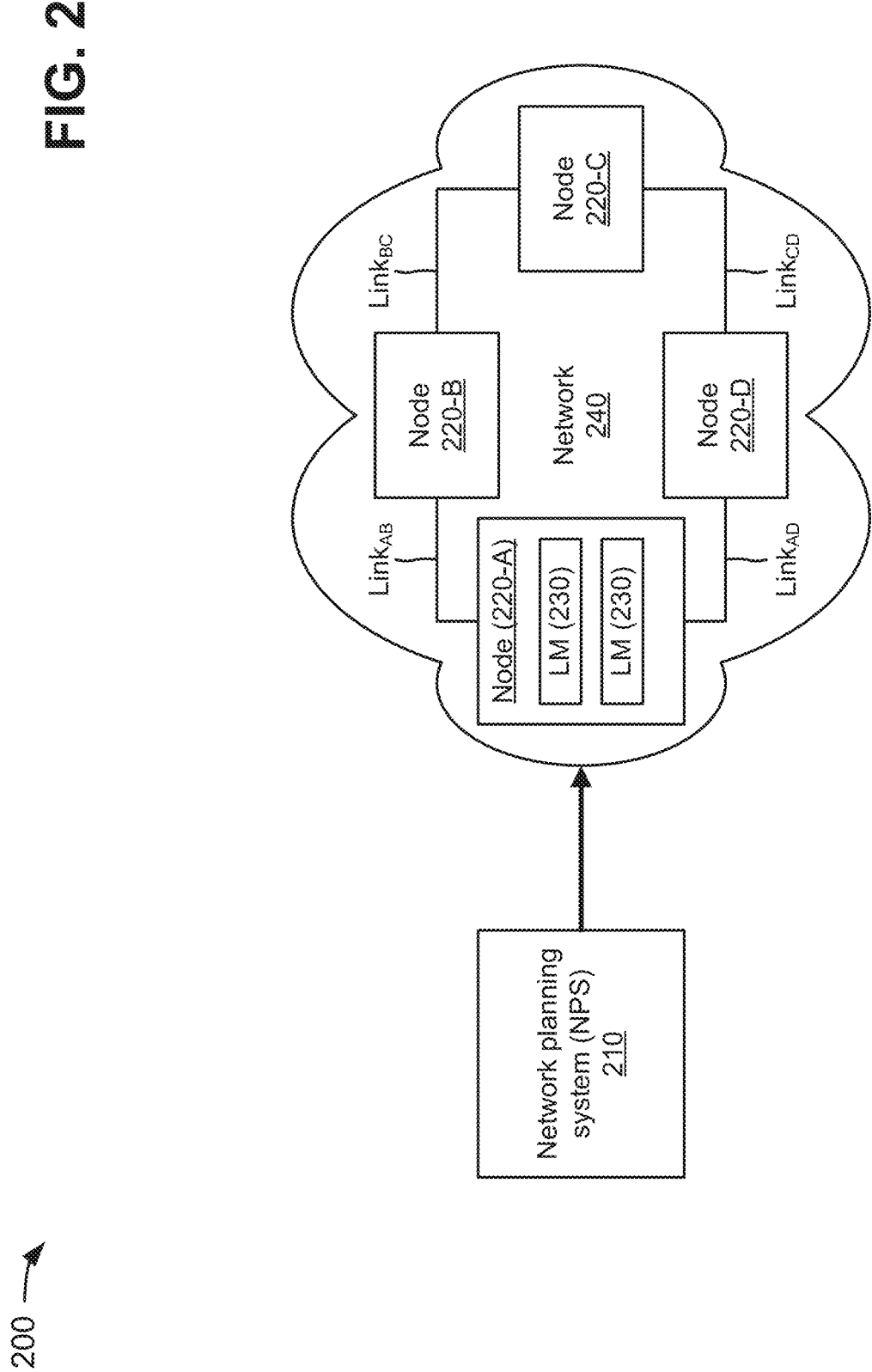
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network planning system 210, nodes 220-A through 220-D (collectively referred to herein as nodes 220, and, in some instances, singularly as node 220), line modules 230 provided in nodes 220, and a network 240. Devices and/or networks of environment 200 may interconnect via wired connections, wireless connections, or a combination of wired and wireless connections.

NPS 210 may include a device capable of receiving, generating, storing, processing, and/or providing information in a manner described herein. For example, NPS 210 may include a communications and/or computing device, such as a mobile phone (e.g., a smart phone, a radiotelephone, etc.), a laptop computer, a tablet computer, a handheld computer, a desktop computer, a workstation computer, or a similar device. In some implementations, NPS 210 may be associated with an entity that provides information associated with a network plan, network resources (e.g., nodes 220, line modules 230, or the like), or the like, to an owner of network 240.

In some implementations, NPS 210 may receive network information associated with a network to be planned (e.g., network 240), and may determine traffic requirements for network 240 based on the network information. NPS 210 may determine a route in network 240 for a particular traffic requirement of the traffic requirements, and may determine whether a route for another traffic requirement is removed based on the route for the particular traffic requirement. If the route for the other traffic requirement is removed, NPS 210 may determine a new route in network 240 for the other traffic requirement. If the route for the other traffic requirement is not removed, NPS 210 may determine whether additional traffic requirements need to be routed in network 240. NPS 210 may repeat this process until routes are determined for all of the traffic requirements, and may generate a network plan for network 240 based on the determined routes for the traffic requirements.

Node 220 may include one or more network devices (e.g., routers, switches, gateways, modems, firewalls, network interface controllers (NICs), hubs, bridges, optical add-drop multiplexers (OADMs), or the like); one or more personal computers; one or more workstation computers; one or more server devices; one or more virtual machines (VMs) provided in a cloud computing environment; one or more base stations provided in a cellular network; or one or more other types of computation and communication devices. In some implementations, node 220 may include one or more input ports associated with receiving traffic and one or more output ports associated with transmitting traffic. In some implementations, node 220 may be connected to one or more other nodes 220. In some implementations, node 220 may communicate with other devices (not shown) in order to process and/or route traffic received by node 220.

Line module 230 may include a hardware component, or a combination of hardware and software components, that may provide network interface operations. In some implementations, line module 230 may receive a multi-wavelength optical signal and/or transmit a multi-wavelength optical signal. A multi-wavelength optical signal may include a number of optical signals of different optical wavelengths. In some implementations, line module 230 may perform retiming, reshaping, regeneration, time division multiplexing, and/or recoding services for each optical wavelength.

Network 240 may include one or more wired and/or wireless networks. For example, network 240 may include a cellular network (e.g., a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to NPS 210 and/or node 220. In some implementations, NPS 210 and/or node 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating a network plan utilizing goal-based network routing. In some implementations, one or more process blocks of FIG. 4 may be performed by NPS 210. Additionally, or alternatively, one or more process blocks of FIG. 4 may be performed by another device or a group of devices separate from or including NPS 210.

As shown in FIG. 4, process 400 may include receiving network information associated with a network to be planned (block 410). For example, a customer associated with NPS 210 may wish to generate a network plan for a network, such as network 240. In some implementations, the customer may utilize NPS 210 to generate the network plan for network 240 by providing network information, associated with network 240, to NPS 210. In some implementations, the customer may provide, to NPS 210 (or a user associated with NPS 240), a request to generate the network plan for network 240, and NPS 410 may receive the request. In some implementations, the request may include the network information associated with network 240. In some implementations, the network information may include information associated with nodes 220 of network 240 (e.g., sizes of nodes 220, a number of nodes 220, physical locations of nodes 220, addresses of nodes 220, or the like); information associated with connectivity (e.g., links) between nodes 220; information associated with traffic requirements between nodes 220 (e.g., referred to herein as "flows"); information associated with line modules 230 of nodes 220 (e.g., sizes of line modules 230, a number of line modules 230, physical locations of line modules 230, addresses of line modules 230, or the like); or the like.

As further shown in FIG. 4, process 400 may include determining traffic requirements for the network based on the network information (block 420). For example, NPS 210 may determine traffic requirements (e.g., demands) for network 240 based on the network information. In some implementations, the network information may include information associated with traffic requirements between nodes 220, and NPS 210 may determine the traffic requirements for network 240 based on the information associated with traffic requirements between nodes 220. For example, assume that the network information includes a first traffic requirement of three-hundred (300) gigabits (Gb) of bandwidth between node 220-A and node 220-B, and a second traffic requirement of one-hundred (100) Gb of bandwidth between node 220-B and node 220-C. In such an example, NPS 210 may identify the (300) Gb bandwidth and the (100) Gb bandwidth as the traffic requirements for network 240.

As further shown in FIG. 4, process 400 may include determining a route in the network for a traffic requirement of the traffic requirements (block 430). For example, NPS 210 may determine or allocate a route in network 240 for one of the determined traffic requirements. In some implementations, NPS 210 may order the traffic requirements in a particular order based on the network information and/or one or more heuristics (e.g., static variable ordering heuristics, dynamic variable ordering heuristics, or the like). In some implementations, NPS 210 may order the traffic requirements into optical carrier groups (OCGs) (e.g., a band on particular wavelengths) based on the network information. In some implementations, NPS 210 may select a random traffic requirement of the ordered traffic requirements. In some implementations, NPS 210 may select a first traffic requirement of the ordered traffic requirements, a second traffic requirement of the ordered traffic requirements, a last traffic requirement, etc. of the ordered traffic requirements.

In some implementations, NPS 210 may attempt to determine the route in network 240 for the selected traffic requirement based on an initial routing process (e.g., a depth first search (DFS) routing process). In the DFS routing process, NPS 210 may start from a source node 220 of network 240 and may traverse network 240 until a destination node 240 is reached. The source node 220 may be representative of multiple chassis (sets) 220 of network 240, and NPS 210 may attempt DFS routing from each chassis (sets) 220 associated with the source node 220. NPS 210 may sort chassis (sets) 220, associated with the source node 220, based on available bandwidths associated with chassis (sets) 220, a number of outgoing links with available bandwidth, or the like. In order to move to a next chassis (set) 220 in network 240, NPS 210 may utilize links that are directly connected to a current chassis (set) 220. In some implementations, NPS 210 may utilize, a routing process, other than the DFS routing process, as the initial routing process (e.g., an expanded graph routing process, a demand routing process, a multi-bay routing process, a minimum cut (mincut) routing process, or the like).

In some implementations, if NPS 210 cannot determine the route for the selected traffic requirement based on the DFS routing process, NPS 210 may determine the route in network 240 for the selected traffic requirement based on a goal-based routing process. In the goal-based routing process, NPS 210 may determine the route in network 240 by starting from a source chassis (e.g., a set of nodes 220) of network 240 and traversing network 240 until destination node 220 is reached. In some implementations, if a path along the route does not have sufficient bandwidth for the selected traffic requirement, NPS 210 may make bandwidth available in the path by removing a route assigned to a previously routed traffic requirement. In some implementations, NPS 210 may determine a new route for the removed route before the route for the selected traffic requirement is routed in network 240. In some implementations, for traffic requirements associated with routes that are removed and reassigned, NPS 210 may recursively remove and reassign new routes to the traffic requirements.

In some implementations, if NPS 210 cannot determine the route for the selected traffic requirement based on the goal-based routing process, NPS 210 may generate a notification indicating that the selected traffic requirement cannot be routed (e.g., a fail). In such implementations, the user of NPS 210 may instruct NPS 210 to modify the selected traffic requirement, utilize another routing process to determine the route for the selected traffic requirement, add equipment (e.g., one or more line modules 230) to accommodate the selected traffic requirement, or the like.

In some implementations, during the goal-based routing process, NPS 210 may search for routes for all of the determined traffic requirements. During a search, NPS 210 may encounter multiple scenarios for each route, such as, for example, nodes 220 with outgoing line modules 230 that do not have available bandwidth; recursively removing and reassigning new routes to previously determined routes in order to free up bandwidth; or the like. In some implementations, a search space for NPS 210 may become exponentially large. In such implementations, NPS 210 may reduce or prune the search space prior to determining routes for the traffic requirements.

In some implementations, NPS 210 may reduce the search space by attempting to determine a route for a single traffic requirement from the traffic requirements, and not attempting to determine routes for the other traffic requirements at the same time. In some implementations, NPS 210 may reduce the search space by removing loops in traffic requirements that are not assigned routes. For example, since goal-based routing is recursive, there may be situations where a route for a first traffic requirement at node 220 removes a route for a second traffic requirement at node 220, and where a route for the second traffic requirement at node 220 removes a route for the first traffic requirement at node 220. This may form an unnecessary loop and lead to no solution. In such an example, once a traffic requirement is used for a node 220 in a recursive loop, NPS 210 may ensure that this traffic requirement is not used on the same node 220 for routing any other traffic requirement in the recursive loop. In some implementations, NPS 210 may provide a logical grouping of flows and demands, such that flows with similar properties may be grouped together as demand sets. For example, assume that a flow D1_1 in a first demand set is allocated a route and removes a route for a flow D1_2 in a second demand set at node 220. In such an example, and to prevent loops, when flow D1_2 is being allocated a route, NPS 210 may ensure that the allocated route does not remove routes for any flows in the first demand set.

In some implementations, NPS 210 may reduce the search space by maintaining a cache of visited nodes 220 for each traffic requirement. For example, assume that there are multiple paths from node 220-A to node 220-C, and that there are two links between node 220-A and node 220-B. In such an example, if NPS 210 attempts a path between node 220-A and node 220-B via a first link and fails, NPS 210 may return to node 220-A but may ignore a second link leading to node 220-B to avoid duplicate work associated with node 220-B.

In some implementations, NPS 210 may reduce the search space by pruning after a particular level of recursion (e.g., where level (0) means NPS 210 may remove the route assigned to a traffic requirement and may attempt to determine a new route for the traffic requirement using only the DFS routing process, and may move to another route if the new route cannot be determined; level (1) means NPS 210 may remove the route assigned to a traffic requirement (TE1), may attempt to determine a new route for TE1 using goal-based routing, and during the attempt to determine a new route for TE1, may remove the route assigned to another traffic requirement (TE2) and may attempt to determine a new route for TE2 using the DFS routing process, etc.). In some implementations, NPS 210 may sequentially remove any number of routes for previously routed traffic requirements, but when determining a new route (e.g., level (0)), NPS 210 may remove routes of other traffic requirements. When determining new routes for newly removed traffic requirements (e.g., level (1)), NPS 210 may utilize the DFS routing process. In some implementations, by pruning the search space after a particular level, NPS 210 may avoid reaching levels associated with links that are far removed from a link at the first level. In some implementations, NPS 210 may perform an iterative level search that searches for a route with the level set to (1), increases the level to (2) if the route cannot be determined and searches for the route, etc. In some implementations, NPS 210 may set the iterative level search to a maximum level (e.g., level (3), level (4), or the like) in order to reduce a time required for the iterative level search.

In some implementations, NPS 210 may reduce the search space by specifying a maximum number of removed routes, associated with traffic requirements, for the pruning after the level. For example, NPS 210 may determine that a traffic requirement cannot be routed (e.g., a fail) when NPS 210 is unable to determine a route for the traffic requirement after removing the maximum number of routes. In some implementations, for level (1) pruning, NPS 210 may set the maximum number of removed routes to a particular number (e.g., in the hundreds, thousands, ten-thousands, or the like), and may increase the particular number as the iterative level search increases the level.

As further shown in FIG. 4, process 400 may include determining whether a route for another traffic requirement is removed for the determined route (block 440). For example, NPS 210 may determine the route in network 240 for the selected traffic requirement by starting from a source chassis of network 240 and traversing network 240 until destination node 220 is reached. In some implementations, all paths along the determined route may have sufficient bandwidth for the selected traffic requirement, and NPS 210 may not remove routes, associated with previously routed traffic requirements, for the determined route. In such implementations, NPS 210 may determine that routes for other traffic requirements are not removed for the determined route in network 240. In some implementations, a path along the determined route may not have sufficient bandwidth for the selected traffic requirement, and NPS 210 may make bandwidth available in the path by removing a route for a previously routed traffic requirement. In such implementations, NPS 210 may determine that a route for another traffic requirement is removed for the determined route in network 240.

As further shown in FIG. 4, if a route for another traffic requirement is removed for the determined route (block 440—Yes), process 400 may include determining a new route in the network for the removed route (block 450). For example, if NPS 210 determines that a route for another traffic requirement is removed for the determined route in network 240, NPS 210 may determine a new route for the other traffic requirement before the selected traffic requirement is routed in network 240. In some implementations, for routes that are removed, NPS 210 may recursively remove the routes and determined new routes for the traffic requirements.

As further shown in FIG. 4, if a new route in the network is determined for the removed route (block 450) or if a route for another traffic requirement is not removed for the determined route (block 440—No), process 400 may include determining whether there is an additional traffic requirement, of the traffic requirements, for which to determine a route in the network (block 460). For example, if NPS 210 determines that routes for the other traffic requirements are not removed for the determined route in network 240, NPS 210 may determine whether there is an additional traffic requirement, of the traffic requirements, for which to determine a route in network 240. In some implementations, NPS 210 may determine that there is an additional traffic requirement(s), for which to determine a route, when NPS 210 has not determined a route(s) for all of the determined traffic requirements. In some implementations, NPS 210 may determine that there is not an additional traffic requirement, for which to determine a route, when NPS 210 has determined routes for all of the determined traffic requirements.

As further shown in FIG. 4, if there is an additional traffic requirement, of the traffic requirements, for which to determine a route in the network (block 460—Yes), process 400 may include returning to block 430. For example, if NPS 210 determines that there is an additional traffic requirement for which to determine a route in network 400, NPS 210 may perform blocks 430-450 of process 400, as described above.

As further shown in FIG. 4, if there is not an additional traffic requirement, of the traffic requirements, for which to determine a route in the network (block 460—No), process 400 may include generating a network plan for the network based on the determined routes for the traffic requirements (block 470). For example, if NPS 210 determines that there is no additional traffic requirement for which to determine a route in network 240, NPS 210 may generate a network plan based on the determined routes in network 240 for the traffic requirements. In some implementations, the network plan may minimize equipment (e.g., line modules 230) required to construct network 240. In some implementations, the network plan may include information associated with a number nodes 220 in network 240; a number of links between nodes 220; a number of line modules 230 in each node 220; addresses for the nodes 220, line modules 230, and/or the links of network; routes for the determined traffic requirements between nodes 220 and/or line modules 230; or the like.

As further shown in FIG. 4, process 400 may include outputting and/or storing the network plan (block 480). For example, NPS 210 may store the network plan in storage (e.g., memory 330 and/or storage component 340, FIG. 3)

associated with NPS 210. In some implementations, NPS 210 may provide the network plan for display to a user associated with NPS 210. In some implementations, NPS 210 may provide the network plan for display to a user associated with a device other than NPS 210. For example, NPS 210 may provide the network plan to a device associated with a customer that plans to build network 240 based on the network plan.

In some implementations, NPS 210 may utilize one or more other operations with the goal-based routing process in order to increase a speed associated with determining the network plan.

In some implementations, NPS 210 may utilize node merge and/or unmerge operations with the goal-based routing process. The node merge and/or unmerge operations may include NPS 210 starting with a single line module 230 in each node 220, and adding one or more line modules 230 to a node 220, or merging two or more nodes 220, when traffic requirements are routed. For example, if NPS 210 determines a route, for a traffic requirement, that enters node 220 from a first direction and exits node 220 from a second direction, NPS 220 may merge node 220 with another node 220 or may add a line module 230 to node 220. In another example, if NPS 210 removes routes for traffic requirements, NPS 210 may unmerge two or more nodes 220 and/or remove one or more line modules 230 from node 220, which may help in routing a current traffic requirement. In some implementations, NPS 210 may move a single line module 230 from one node 220 to another node 220 in order to determine a route for a traffic requirement.

In some implementations, NPS 210 may utilize graph state and revert operations with the goal-based routing process. In the goal-based routing process, NPS 210 may remove various routes and/or determine new routes for traffic requirements before determining whether a traffic requirement can be routed. During this process, since there may be a single copy of a graph every time a route for a traffic requirement is removed and/or a new route is determined, or a node 220 merged and/or unmerged with other nodes 220, the state of the graph may be changing. If a recursive routing attempt fails, NPS 210 may revert all previously attempted recursive routing attempt in order to bring the graph back to the same state before the recursive routing attempt failed. In some implementations, NPS 210 may maintain a data structure (e.g., a stack, a list, or the like) of changes attempted by NPS 210. Whenever a route for a traffic requirement is removed and/or a new route is determined, or a node 220 is merged and/or unmerged with other nodes 220, NPS 210 may add such changes to the data structure. In some implementations, NPS 210 may maintain a change number with each change provided to the data structure. Thus, if a recursive routing attempt fails, NPS 210 may revert the state of the graph to a previous state, before any of the changes were attempted, by reading one change of the data structure (e.g., in a last-in first-out (LIFO) manner) until a target change number is reached.

In some implementations, NPS 210 may utilize bulk remove operations with the goal-based routing process. There may be cases where bandwidth is not a problem, but a route for a traffic requirement is blocked at nodes 220 (e.g., when there is bandwidth for a traffic requirement, but the bandwidth is available in two different nodes 220 that cannot merge). The bulk remove operations may include NPS 210 removing routes for traffic requirements in one or both nodes 220 in a manner that enables the two nodes 220 to merge and route a current traffic requirement, while determining new routes the removed routes. In some implementations, for source nodes 220 and/or middle nodes 220 of a route, NPS 210 may first attempt to remove routes for all traffic requirements on an outgoing node 220, may merge outgoing node 220 with an incoming node 220, and may determine new routes for removed routes. If NPS 210 is unable to remove routes for all traffic requirements on outgoing node 220, NPS 210 may remove routes for traffic requirements from a line module 230 (e.g., from a first node 220) supporting a minimum number of traffic requirements, and may unmerge line module 230 from first node 220. NPS 210 may then merge a second node 220 with first node 220 (e.g., via the space freed up by the unmerged line module 230), and may determine new routes for the removed routes. In some implementations, for destination nodes 220 of a route, NPS 210 may attempt to remove routes for all traffic requirements, except a current traffic requirement, on an outgoing node 220, may merge outgoing node 220 with an incoming node 220, and may determine new routes for the removed routes. In such implementations, NPS 210 may also remove routes for traffic requirements on incoming node 220 to ensure that outgoing node 220 merges with incoming node 220.

In some implementations, NPS 210 may utilize upfront addition operations with the goal-based routing process. In some implementations, all initial traffic requirements routed over a particular node 220 may pass through the particular node 220. When this occurs, NPS 210 may provide the particular node 220 with only line modules 230 (e.g., with available bandwidth) and no or less than required other components (e.g., optical tributary modules (OTMs), or the like). If later traffic requirements are determined for the particular node 220, the later traffic requirements may not be routed since the other components are not available in the particular node 220. In some implementations, to address this, NPS 210 may add one or more other components to the particular node 220 upfront based on a total bandwidth required on the particular node 220 and bandwidth required by later traffic requirements.

In some implementations, NPS 210 may utilize component merge operations with the goal-based routing process. When a size of node 220 prohibits node 220 from being merged with other nodes 220, the component merge operations may include NPS 210 reducing the size of node 220 by merging components (e.g., OTMs) of node 220. For example, if a bandwidth required by two or more OTMs can be satisfied by a single OTM, NPS 210 may merge the OTMs together to form a single OTM. This may decrease the size of node 220, and may make it possible to merge node 220 with other nodes 220.

In some implementations, NPS 210 may utilize minimum line module count operations with the goal-based routing process. A minimum line module count is a number of line modules 230 required to route all traffic requirements for network 240. The minimum line module count operations may include NPS 210 creating a graph based on OCGs generated by a previous minimum line module count, and routing all the traffic requirements on the graph. NPS 210 may iterate over all the OCGs by removing routes for traffic requirements on a particular OCG, removing the particular OCG from the graph, and determine new routes for the removed routes on the revised graph (e.g., without the particular OCG). If the new routes are successful, the graph may include one less OCG, and the iteration may continue. If the new routes are unsuccessful, the particular OCG may be provided back in the graph. After the iteration is complete, a number of remaining OCGs in the graph may correspond to a new minimum line module count. In some implementations, NPS 210 may determine a theoretical minimum line module number (e.g., X) that includes a minimum number of line modules 230 required for network 240. In such implementations, NPS 210 may calculate a final number (e.g., Y) of line modules 230 for network 240, as described herein, that is different than the theoretical minimum line module number (e.g., Y>X). The goal-based routing process attempts to minimize the difference between the calculated number (e.g., Y) of line modules 230 and the theoretical minimum line module number (e.g., X), which may minimize a number of line modules 230 used in network 240. The theoretical minimum line module number may determine a number of OCGs that are required between nodes 220 in network 240, and may be utilized as an input to the goal-based routing process. The goal-based routing process may attempt to identify a route for all traffic requirements using line modules 230 determined by the theoretical minimum line module number.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to capacity planning. FIGS. 5A-5D show a capacity planning example that involves determining equipment required for particular traffic requirements. In example 500 of FIGS. 5A-5D, it is assumed that two line modules 230 form a defined bandwidth of a particular value (e.g., (500) Gb).

Figure 5A:
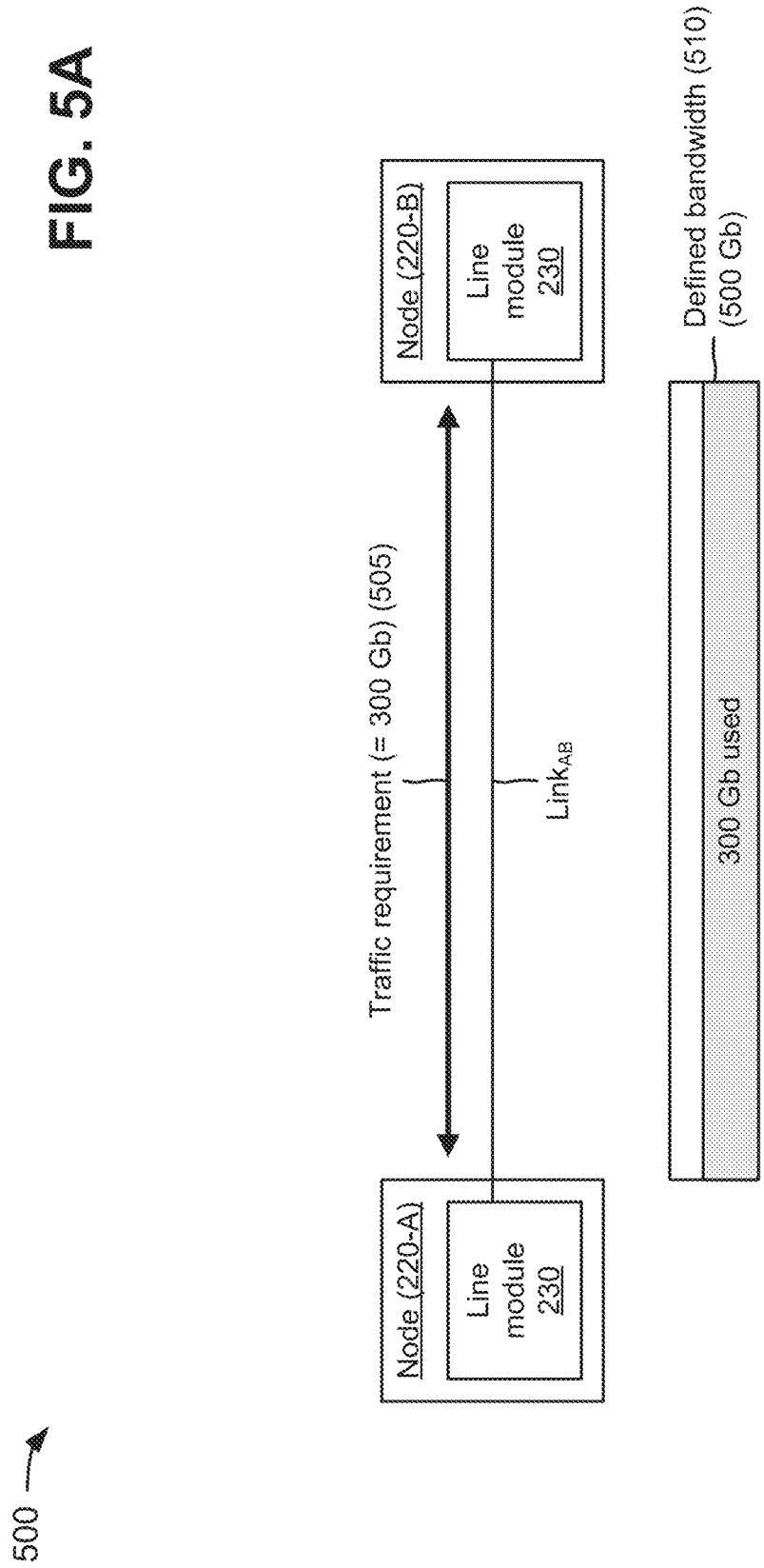
FIGS. 5A-5D are diagrams of an example implementation relating to capacity planning.

As shown in FIG. 5A, assume that NPS 210 receives network information associated with a network that includes node 220-A and node 220-B. Further, assume that node 220-A includes line module 230 and that node 220-B includes line module 230. The network information may include information associated with node 220-A, node 220-B, and a traffic requirement 505 to be provided between node 220-A and node 220-B. For example, traffic requirement 505 may indicate that traffic provided between node 220-A and node 220-B requires a bandwidth of (300) Gb. NPS 210 may identify traffic requirement 505 in the network information, and may determine a route in the network for traffic requirement 505. For example, as shown in FIG. 5A, NPS 210 may determine that traffic requirement 505 can be provided by a OCG (e.g., referred to as a link, $Link_{AB}$) provided between line modules 230 of node 220-A and node 220-B. NPS 210 may also determine that the two line modules 230 form a defined bandwidth 510 (e.g., via $Link_{AB}$) that includes a particular bandwidth (e.g., (500) Gb). As further shown in FIG. 5A, traffic requirement 505 may utilize (300) Gb of the bandwidth allotted by defined bandwidth 510.

Figure 5B:
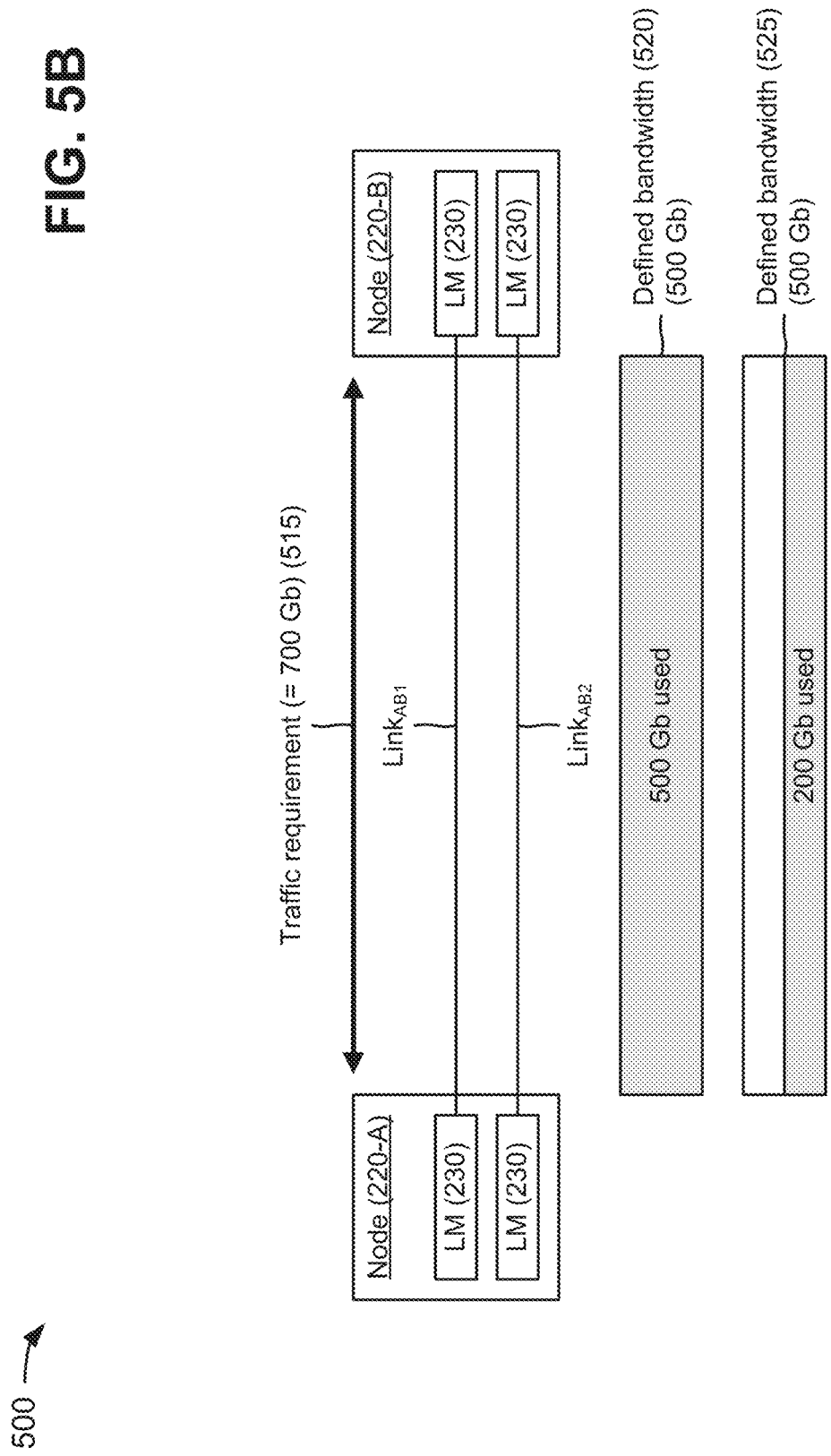

As shown in FIG. 5B, assume that NPS 210 receives network information associated with a network that includes node 220-A and node 220-B. Further, assume that node 220-A includes two line modules 230 and that node 220-B includes two line modules 230. The network information may include information associated with node 220-A, node 220-B, and a traffic requirement 515 to be provided between node 220-A and node 220-B. For example, traffic requirement 515 may indicate that traffic provided between node 220-A and node 220-B requires a bandwidth of (700) Gb. NPS 210 may identify traffic requirement 515 in the network information, and may determine a route in the network for traffic requirement 515. For example, as shown in FIG. 5B, NPS 210 may determine that traffic requirement 515 can be provided by a first OCG (e.g., referred to as a link, $Link_{AB1}$) and a second link (e.g., $Link_{AB2}$) provided between line modules 230 of node 220-A and node 220-B. NPS 210 may determine that two line modules 230 (e.g., associated with $Link_{AB1}$) form a first defined bandwidth 520 of (500) Gb, and that two line modules 230 (e.g., associated with $Link_{AB2}$) form a second defined bandwidth 525 of (500) Gb. As further shown in FIG. 5B, traffic requirement 515 may utilize (500) Gb of the bandwidth allotted by first defined bandwidth 520 and (200) Gb of the bandwidth allotted by second defined bandwidth 525.

Figure 5C:
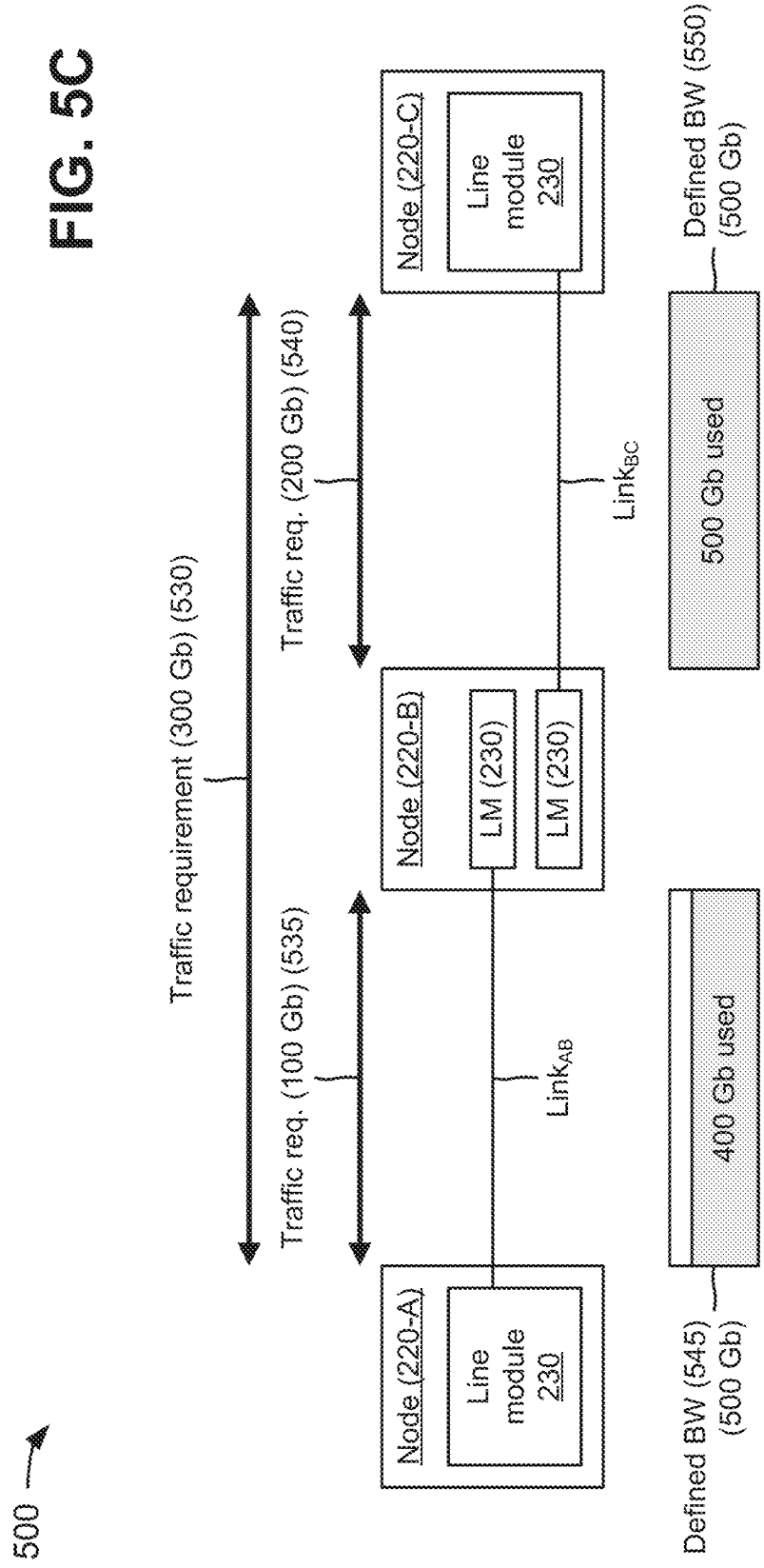

As shown in FIG. 5C, assume that NPS 210 receives network information associated with a network that includes node 220-A, node 220-B, and node 220-C. Further, assume that node 220-A includes line module 230, that node 220-B includes two line modules 230, and that node 220-C includes line module 230. The network information may include information associated with node 220-A, node 220-B, node 220-C, a first traffic requirement 530 to be provided between node 220-A and node 220-C, a second traffic requirement 535 to be provided between node 220-A and node 220-B, and a third traffic requirement 540 to be provided between node 220-B and node 220-C. For example, first traffic requirement 530 may indicate that traffic provided between node 220-A and node 220-C requires a bandwidth of (300) Gb. Second traffic requirement 535 may indicate that traffic provided between node 220-A and node 220-B requires a bandwidth of (100) Gb. Third traffic requirement 540 may indicate that traffic provided between node 220-B and node 220-C requires a bandwidth of (200) Gb.

NPS 210 may identify traffic requirements 530-540 in the network information, and may determine routes in the network for traffic requirements 530-540. For example, as shown in FIG. 5C, NPS 210 may determine that first traffic requirement 530 can be provided by a OCG (e.g., referred to as a link, $Link_{AB}$) provided between line modules 230 of node 220-A and node 220-B and a link (e.g., $Link_{BC}$) provided between line modules 230 of node 220-B and node 220-C. NPS 210 may determine that second traffic requirement 535 can be provided by $Link_{AB}$, and that third traffic requirement 540 can be provided by $Link_{BC}$. NPS 210 may also determine that line module 230 of node 220-A and one line module 230 of node 220-B form a first defined bandwidth 545 of (500) Gb. NPS 210 may determine that another line module 230 of node 220-B and line module 230 of node 220-C form a second defined bandwidth 550 of (500) Gb. As further shown in FIG. 5C, first traffic requirement 530 and second traffic requirement 535 may utilize (400) Gb of the bandwidth allotted by first defined bandwidth 545, and first traffic requirement 530 and third traffic requirement 540 may utilize (500) Gb of the bandwidth allotted by second defined bandwidth 550.

Figure 5D:
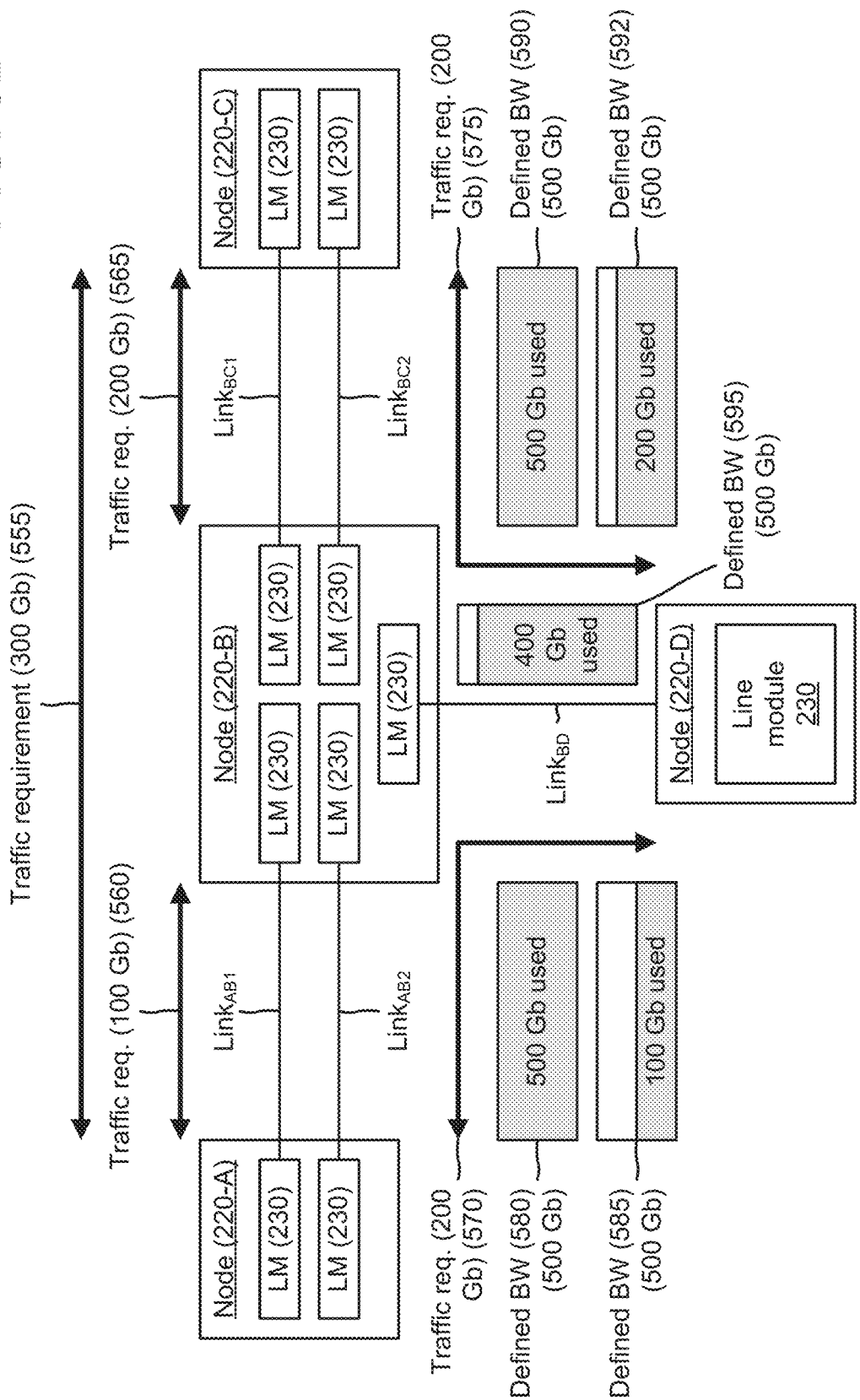

As shown in FIG. 5D, assume that NPS 210 receives network information associated with a network that includes node 220-A, node 220-B, node 220-C, and node 220-D. Further, assume that node 220-A includes two line modules 230, that node 220-B includes five line modules 230, that node 220-C includes two line modules 230, and that node 220-D includes line module 230. The network information may include information associated with node 220-A, node 220-B, node 220-C, node 220-D, a first traffic requirement 555 to be provided between node 220-A and node 220-C, a second traffic requirement 560 to be provided between node 220-A and node 220-B, a third traffic requirement 565 to be provided between node 220-B and node 220-C, a fourth traffic requirement 570 to be provided between node 220-A and node 220-D, and a fifth traffic requirement 575 to be provided between node 220-C and node 220-D. For example, first traffic requirement 555 may indicate that traffic provided between node 220-A and node 220-C requires a bandwidth of (300) Gb. Second traffic requirement 560 may indicate that traffic provided between node 220-A and node 220-B requires a bandwidth of (100) Gb. Third traffic requirement 565 may indicate that traffic provided between node 220-B and node 220-C requires a bandwidth of (200) Gb. Fourth traffic requirement 570 may indicate that traffic provided between node 220-A and node 220-D requires a bandwidth of (200) Gb. Fifth traffic requirement 575 may indicate that traffic provided between node 220-C and node 220-D requires a bandwidth of (200) Gb.

NPS 210 may identify traffic requirements 555-575 in the network information, and may determine routes in the network for traffic requirements 555-575. For example, as shown in FIG. 5D, NPS 210 may determine that first traffic requirement 555 can be provided by a OCG (e.g., referred to as a link, $Link_{AB1}$) provided between line modules 230 of node 220-A and node 220-B and a link (e.g., $Link_{BC1}$) provided between line modules 230 of node 220-B and node 220-C. NPS 210 may determine that second traffic requirement 560 can be provided by another a link (e.g., $Link_{AB2}$) provided between line modules 230 of node 220-A and node 220-B, and that third traffic requirement 565 can be provided by $Link_{BC1}$. NPS 210 may determine that fourth traffic requirement 570 can be provided by $Link_{AB1}$ and a link (e.g., $Link_{BD}$) provided between line modules 230 of node 220-B and node 220-D. NPS 210 may determine that fifth traffic requirement 575 can be provided by another link (e.g., $Link_{BC2}$) provided between line modules 230 of node 220-B and node 220-C and by $Link_{BD}$.

NPS 210 may also determine that one line module 230 of node 220-A and one line module 230 of node 220-B form a first defined bandwidth 580 of (500) Gb. NPS 210 may determine that another line module 230 of node 220-A and another line module 230 of node 220-B form a second defined bandwidth 585 of (500) Gb. NPS 210 may determine that another line module 230 of node 220-B and one line module 230 of node 220-C form a third defined bandwidth 590 of (500) Gb. NPS 210 may determine that another line module 230 of node 220-B and another line module 230 of node 220-C form a fourth defined bandwidth 592 of (500) Gb. NPS 210 may determine that another line module 230 of node 220-B and line module 230 of node 220-D form a fifth defined bandwidth 595 of (500) Gb. As further shown in FIG. 5D, first traffic requirement 555 and fourth traffic requirement 570 may utilize (500) Gb of the bandwidth allotted by first defined bandwidth 580; second traffic requirement 560 may utilize (100) Gb of the bandwidth allotted by second defined bandwidth 585; first traffic requirement 555 and third traffic requirement 565 may utilize (500) Gb of the bandwidth allotted by third defined bandwidth 590; fifth traffic requirement 575 may utilize (200) Gb of the bandwidth allotted by fourth defined bandwidth 592; and fourth traffic requirement 570 and fifth traffic requirement may utilize (400) Gb of the bandwidth allotted by the fifth defined bandwidth 595.

As indicated above, FIGS. 5A-5D are provided merely as an example. Other examples are possible and may differ from what was described with regard to FIGS. 5A-5D.

FIGS. 6A-6L are diagrams of an example implementation 600 relating to example process 400 shown in FIG. 4. FIGS. 6A-6L show an example of determining routes for traffic requirements in network 240.

As shown in FIG. 6A, assume that NPS 210 receives network information associated with a network that includes node 220-A, node 220-B, node 220-C, and node 220-D. Further, assume that nodes 220-A, 220-B, 220-C, and 220-D include a number 605 of line modules 230. For example, a first portion of node 220-B may include (7) line modules 230, a second portion of node 220-B may include (6) line modules 230, a third portion of node 220-B may include (3) line modules 230, and a fourth portion of node 220-B may include (5) line modules 230. As further shown in FIG. 6A, line modules 230 of nodes 220-A, 220-B, 220-C, and 220-D may form defined bandwidths 610 between nodes 220-A, 220-B, 220-C, and 220-D, and defined bandwidths 610 may include available bandwidths 615. For example, defined bandwidth 610-1 (e.g., with (230) Gb of available bandwidth) may be provided between line modules 230 of node 220-A and node 220-B; defined bandwidth 610-2 (e.g., with (300) Gb of available bandwidth) may be provided between line modules 230 of node 220-B and node 220-C; defined bandwidth 610-3 (e.g., with (0) Gb of available bandwidth) may be provided between line modules 230 of node 220-C and node 220-D; defined bandwidth 610-4 (e.g., with (230) Gb of available bandwidth) may be provided between line modules 230 of node 220-A and node 220-B; defined bandwidth 610-5 (e.g., with (130) Gb of available bandwidth) may be provided between line modules 230 of node 220-A and node 220-B; defined bandwidth 610-6 (e.g., with (300) Gb of available bandwidth) may be provided between line modules 230 of node 220-B and node 220-C; defined bandwidth 610-7 (e.g., with (0) Gb of available bandwidth) may be provided between line modules 230 of node 220-C and node 220-D; and defined bandwidth 610-8 (e.g., with (100) Gb of available bandwidth) may be provided between line modules 230 of node 220-C and node 220-D.

The network information may include information associated with nodes 220-A, 220-B, 220-C, and 220-D; line modules 230 provided in nodes 220-A, 220-B, 220-C, and 220-D; defined bandwidths 610-1 through 610-8; available bandwidth 615; and traffic requirements to be provided in the network. For example, as shown in FIG. 6A, a first traffic requirement may require (10) Gb of bandwidth and be associated with a route D1 from node 220-A to node 220-D; a second traffic requirement may require (10) Gb of bandwidth and be associated with a route D2 from node 220-B to node 220-D; and a third traffic requirement may require (10) Gb of bandwidth and be associated with a route D3 from node 220-C to node 220-D. NPS 210 may determine the traffic requirements (e.g., routes D1, D2, and D3) for the network based on the network information, and may attempt to determine routes for the traffic requirements.

Figure 6B:
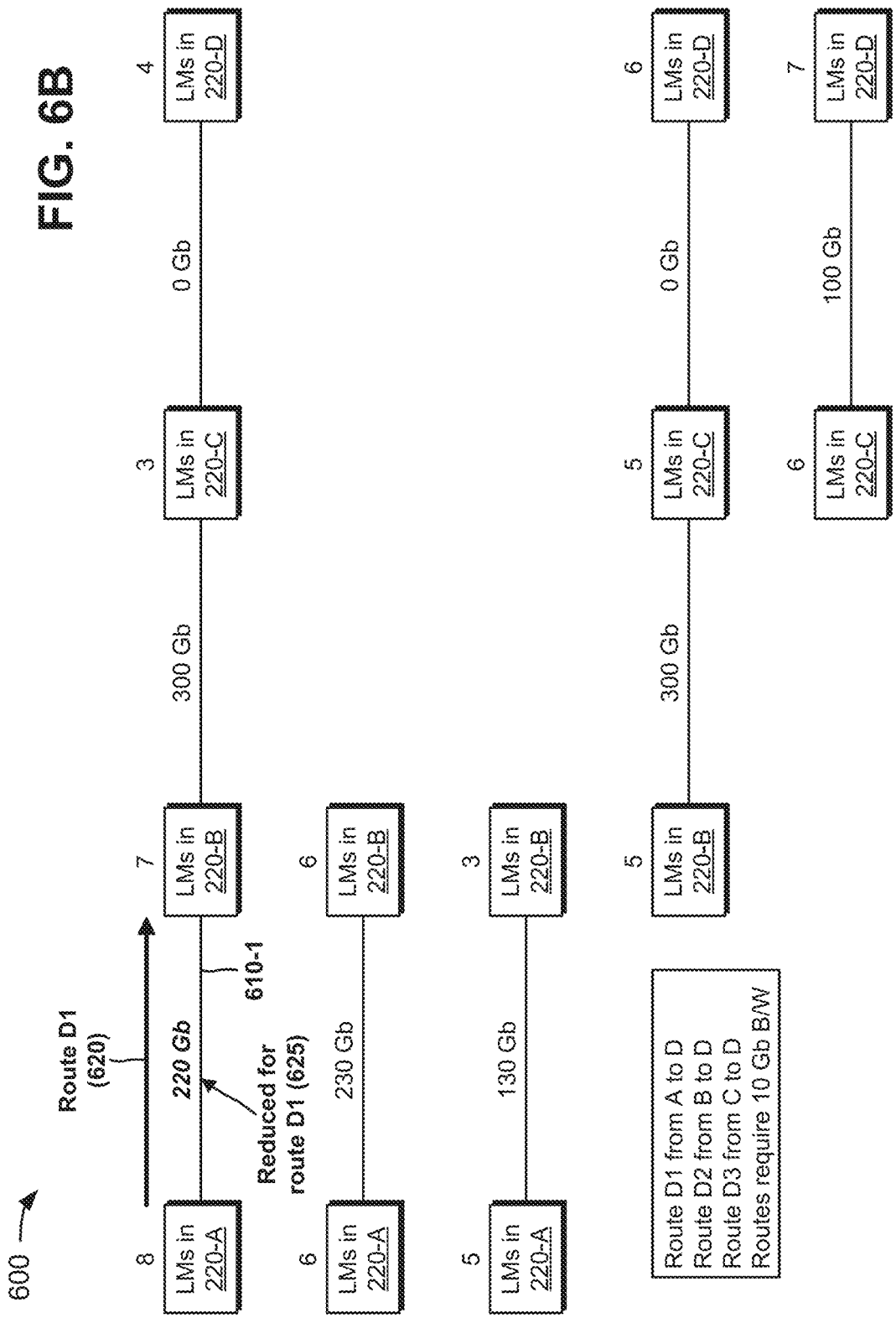

As shown in FIG. 6B, NPS 210 may attempt to determine a route 620 for the first traffic requirement (e.g., route D1). For example, since the first traffic requirement requires a route from node 220-A to node 220-D, NPS 210 may determine whether route 620 can be provided from node 220-A to node 220-B based on the available bandwidth (e.g., (230) Gb) associated with defined bandwidth 610-1. As further shown in FIG. 6B, NPS 210 may determine that route 620 can be provided from node 220-A to node 220-B since defined bandwidth 610-1 has available bandwidth, and may reduce the available bandwidth of defined bandwidth 610-1 by the (10) Gb required for route 620, as indicated by reference number 625.

Figure 6C:
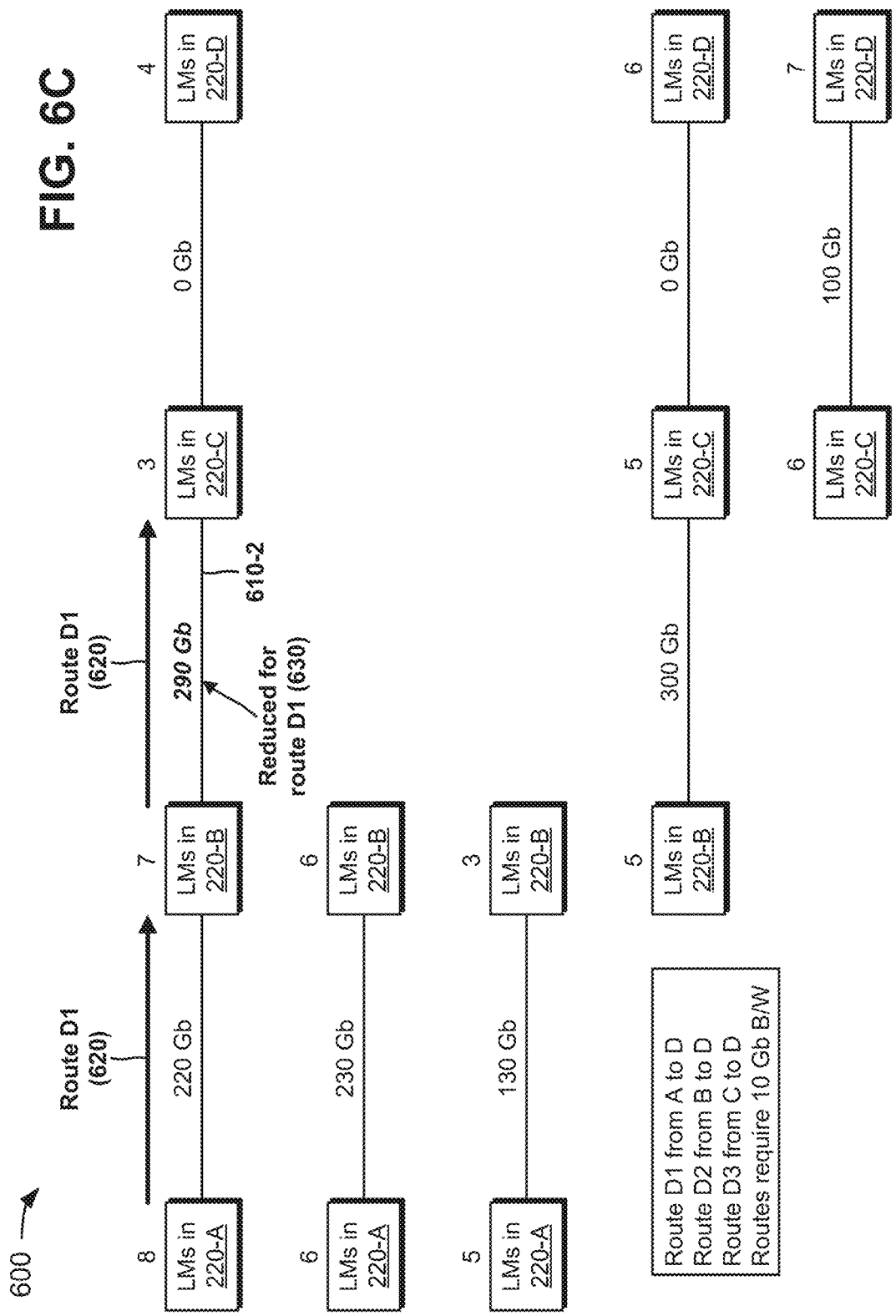

As shown in FIG. 6C, NPS 210 may then determine whether route 620 can be provided from node 220-B to node 220-C based on the available bandwidth (e.g., (300) Gb) associated with defined bandwidth 610-2. As further shown in FIG. 6C, NPS 210 may determine that route 620 can be provided from node 220-B to node 220-C since defined bandwidth 610-2 has available bandwidth, and may reduce the available bandwidth of defined bandwidth 610-2 by the (10) Gb required for route 620, as indicated by reference number 630.

As shown in FIG. 6D, NPS 210 may determine whether route 620 can be provided from node 220-C to node 220-D based on the available bandwidth (e.g., (0) Gb) associated with defined bandwidth 610-3. As further shown in FIG. 6D, NPS 210 may determine that route 620 cannot be provided from node 220-C to node 220-D since defined bandwidth 610-3 does not have available bandwidth, as indicated by reference number 635. Thus, NPS 210 may determine a route for a traffic requirement, associated with defined bandwidth 610-3, to remove in order to free up bandwidth for route 620.

As shown in FIG. 6E, assume that NPS 210 determines that the second traffic requirement (e.g., associated with route D2) utilizes (10) Gb of bandwidth on defined bandwidth 610-3. NPS 210 may remove a route for the second traffic requirement from defined bandwidth 610-3 in order to make (10) Gb of bandwidth available on defined bandwidth 610-3, as indicated by reference number 640. NPS 210 may determine that route 620 can be provided from node 220-C to node 220-D since defined bandwidth 610-3 has the (10) Gb of available bandwidth for route 620. However, NPS 210 may not allocate route 620 to defined bandwidth 610-3 until a new route is determined for the second traffic requirement.

As shown in FIG. 6F, NPS 210 may attempt to determine a route 645 (e.g., a new route) for the second traffic requirement (e.g., route D2). For example, since the second traffic requirement requires a route from node 220-B to node 220-D, NPS 210 may determine whether route 645 can be provided from node 220-B to node 220-C based on the available bandwidth (e.g., (290) Gb) associated with defined bandwidth 610-2. NPS 210 may determine that route 645 can be provided from node 220-B to node 220-C since defined bandwidth 610-2 has available bandwidth, and may reduce the available bandwidth of defined bandwidth 610-2 by the (10) Gb (e.g., to (280) Gb) required for route 645. As further shown in FIG. 6F, NPS 210 may determine whether route 645 can be provided from node 220-C to node 220-D based on the available bandwidth (e.g., (10) Gb) associated with defined bandwidth 610-3. However, NPS 210 may determine that route 645 cannot be provided from node 220-C to node 220-D since defined bandwidth 610-3 has reserved the available bandwidth for route 620, as indicated by reference number 650. Thus, NPS 210 may attempt to determine another new route for the second traffic requirement.

As shown in FIG. 6G, NPS 210 may determine whether route 645 can be provided (e.g., via a hop) from a first set of line modules 230 of node 220-B to a second set of line modules of node 220-B. As further shown in FIG. 6G, NPS 210 may determine that route 645 cannot be provided from the first set of line modules 230 of node 220-B to the second set of line modules of node 220-B, as indicated by reference number 655, since there may be limit on a number of line modules 230 that may be used by a single node 220. For example, assume that the limit on the number of line modules 230 is ten, that the first set of line modules 230 includes seven line modules 230, and that the second set of line modules 230 includes five line modules 230. In such an example, the two sets of line modules 230 may add up to twelve line modules 230, which is greater than the limit (e.g., ten) on the number of line modules 230. Thus, NPS 210 may once again attempt to determine another new route for the second traffic requirement.

As shown in FIG. 6H, NPS 210 may determine whether route 645 can be provided from node 220-B to node 220-C based on the available bandwidth (e.g., (300) Gb) associated with defined bandwidth 610-6. NPS 210 may determine that route 645 can be provided from node 220-B to node 220-C since defined bandwidth 610-6 has available bandwidth, and may reduce the available bandwidth of defined bandwidth 610-6 by the (10) Gb (e.g., to (290) Gb) required for route 645, as indicated by reference number 660. As further shown in FIG. 6H, NPS 210 may determine whether route 645 can be provided from node 220-C to node 220-D based on the available bandwidth (e.g., (0) Gb) associated with defined bandwidth 610-7. However, NPS 210 may determine that route 645 cannot be provided from node 220-C to node 220-D since defined bandwidth 610-7 does not have available bandwidth, as indicated by reference number 665. Thus, NPS 210 may determine a route for a traffic requirement, associated with defined bandwidth 610-7, to remove in order to free up bandwidth for route 645.

Figure 6I:
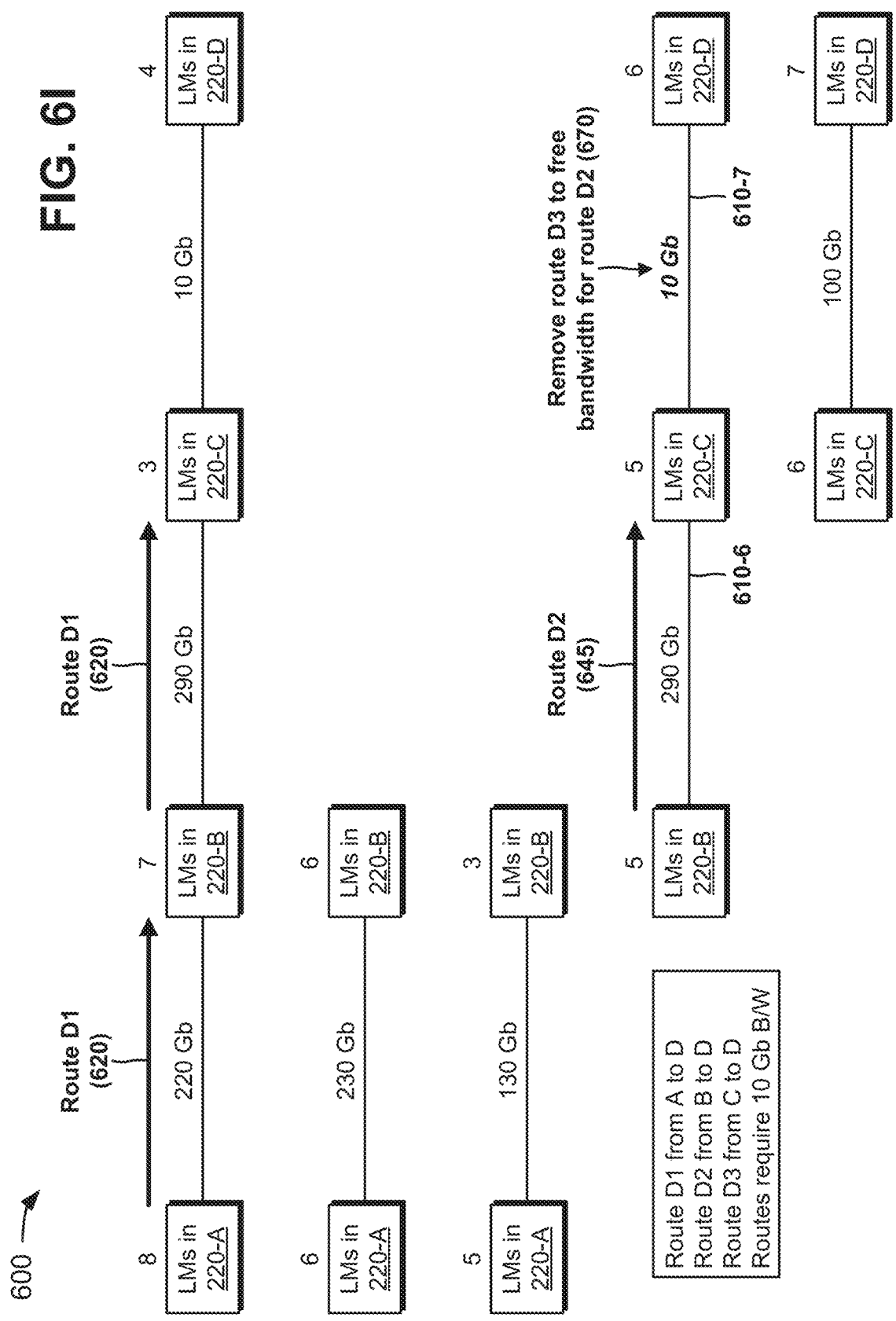

As shown in FIG. 6I, assume that NPS 210 determines that the third traffic requirement (e.g., associated with route D3) utilizes (10) Gb of bandwidth on defined bandwidth 610-7. NPS 210 may remove a route for the third traffic requirement from defined bandwidth 610-7 in order to make (10) Gb of bandwidth available on defined bandwidth 610-7, as indicated by reference number 670. NPS 210 may determine that route 645 can be provided from node 220-C to node 220-D since defined bandwidth 610-7 has the (10) Gb of available bandwidth for route 645. However, NPS 210 may not allocate route 645 to defined bandwidth 610-7 until a new route is determined for the third traffic requirement.

As shown in FIG. 6J, NPS 210 may attempt to determine a route (e.g., a new route) for the third traffic requirement (e.g., route D3). For example, since the third traffic requirement requires a route from node 220-C to node 220-D, NPS 210 may determine whether the new route can be provided from node 220-C to node 220-D based on the available bandwidth (e.g., (10) Gb) associated with defined bandwidth 610-3. However, NPS 210 may determine that the new route cannot be provided from node 220-C to node 220-D since defined bandwidth 610-3 has reserved the available bandwidth for route 620, as indicated by reference number 675. As further shown in FIG. 6J, NPS 210 may determine whether the new route can be provided from node 220-C to node 220-D based on the available bandwidth (e.g., (10) Gb) associated with defined bandwidth 610-7. However, NPS 210 may determine that the new route cannot be provided from node 220-C to node 220-D since defined bandwidth 610-7 has reserved the available bandwidth for route 645, as further indicated by reference number 675. Thus, NPS 210 may attempt to determine another new route for the third traffic requirement.

Figure 6K:
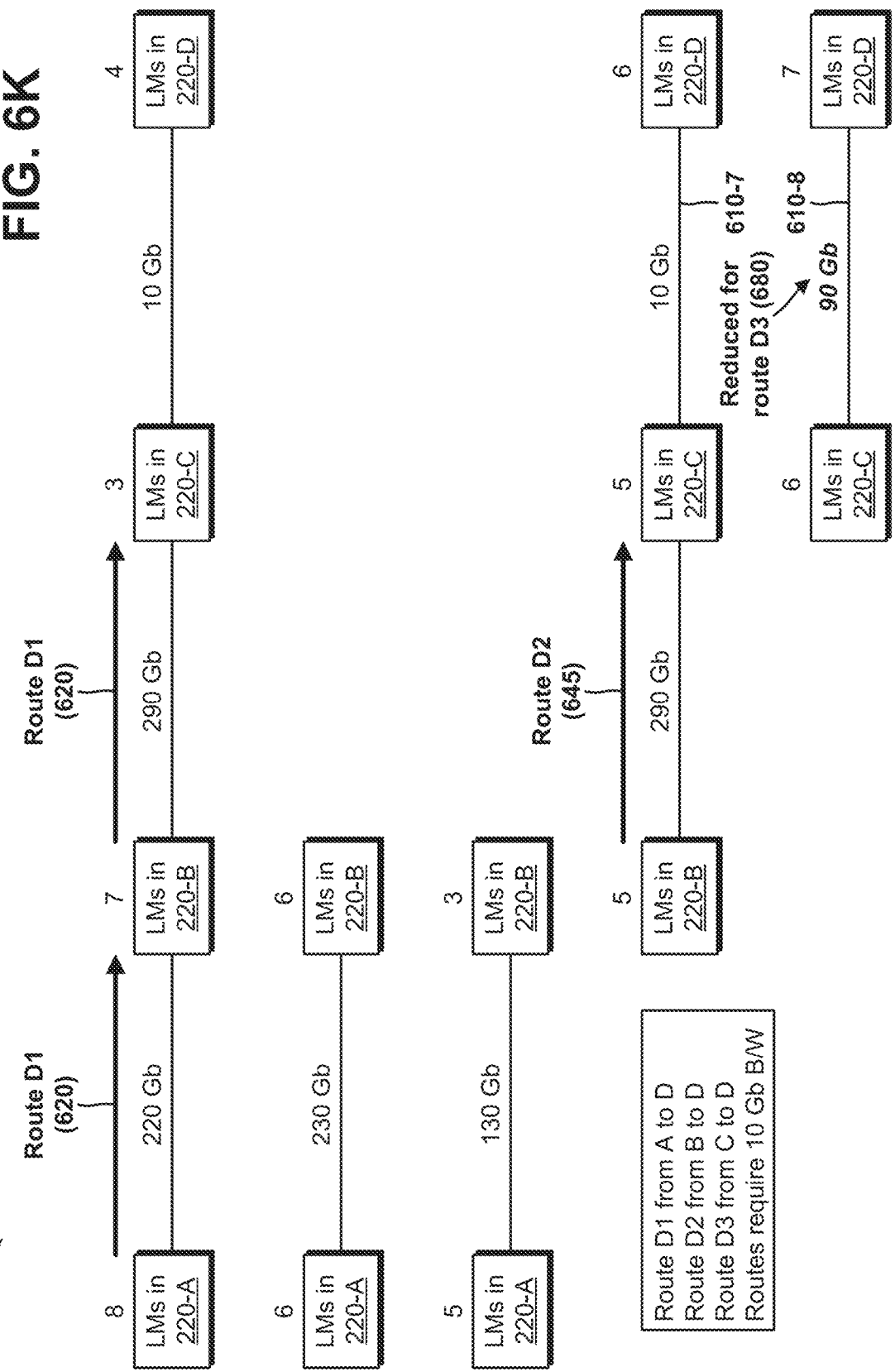

As shown in FIG. 6K, NPS 210 may determine whether the new route for the third traffic requirement can be provided from node 220-C to node 220-D based on the available bandwidth (e.g., (100) Gb) associated with defined bandwidth 610-8. As further shown in FIG. 6K, NPS 210 may determine that the new route can be provided from node 220-C to node 220-D since defined bandwidth 610-8 has available bandwidth, and may reduce the available bandwidth of defined bandwidth 610-8 by the (10) Gb required for the new route, as indicated by reference number 680.

Figure 6L:
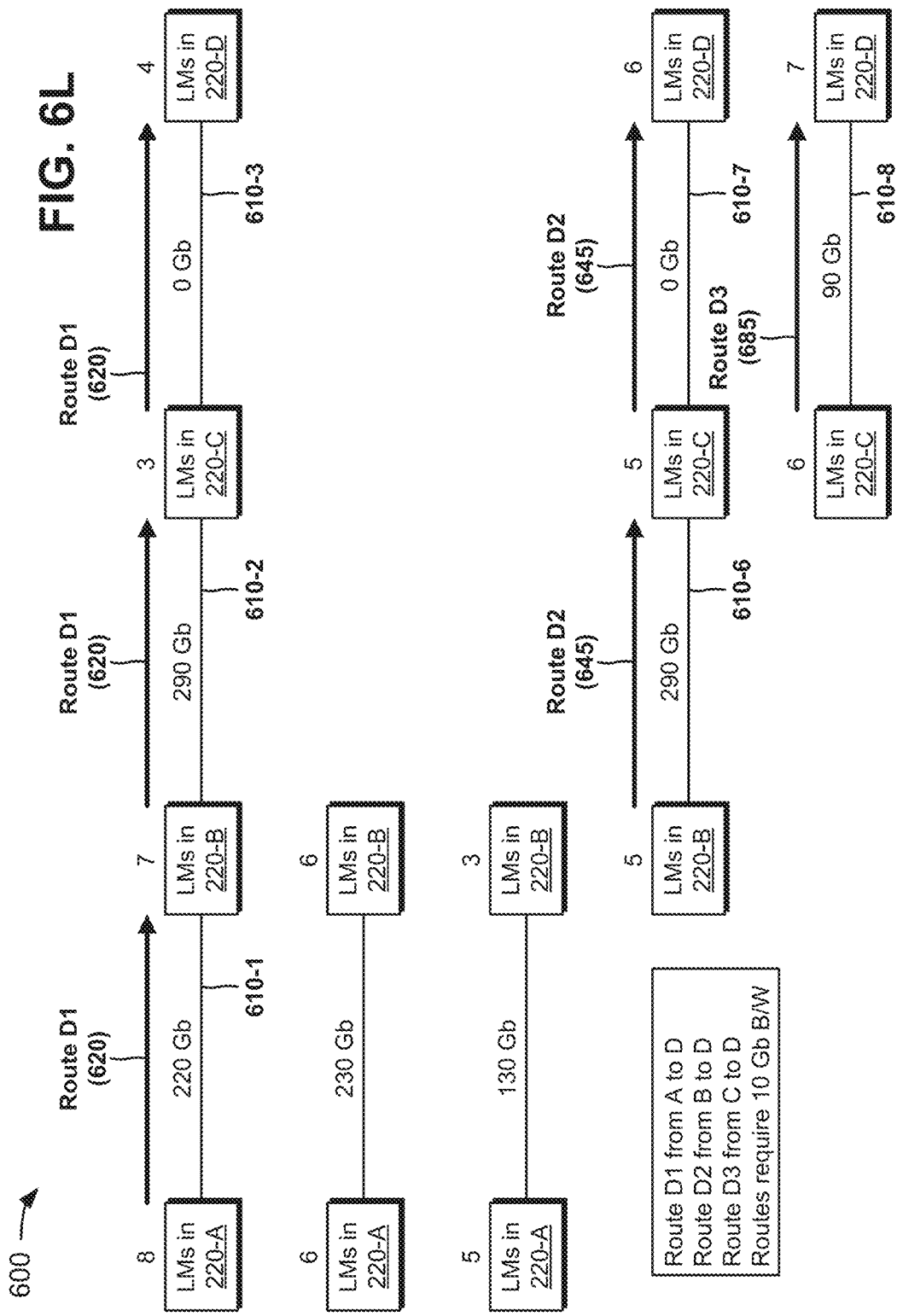

As shown in FIG. 6L, since new routes have been determined for all of the removed routes, NPS 210 may first complete a route 685 for the third traffic requirement by allocating route 685 to defined bandwidth 610-8. NPS 210 may then complete route 645 for the second traffic requirement by allocating route 645 to defined bandwidth 610-7 and reducing the available bandwidth of defined bandwidth 610-7 by the (10) Gb required for route 645. Finally, NPS 210 may complete route 620 for the first traffic requirement by allocating route 620 to defined bandwidth 610-3 and reducing the available bandwidth of defined bandwidth 610-3 by the (10) Gb required for route 620. In some implementations, NPS 210 may wait for route D3 to be allocated before allocating route D2, and may wait for routes D2 and D3 to be allocated before allocating route D1. In some implementations, NPS 210 may maintain a data structure (e.g., a stack) that stores information associated with the routes to be allocated (e.g., a stack with route D1 information at the bottom, route D2 information in the middle, and route D3 information at the top). NPS 210 may utilize the information depicted in FIG. 6L to generate a network plan for the network, and may store the network plan in storage (e.g., memory 330 and/or storage component 340, FIG. 3). In some implementations, NPS 210 may provide the network plan for display to a user associated with NPS 210. In some implementations, NPS 210 may provide the network plan to a device associated with a customer that plans to build the network based on the network plan.

As indicated above, FIGS. 6A-6L are provided merely as an example. Other examples are possible and may differ from what was described with regard to FIGS. 6A-6L.

Systems and/or methods, described herein, may provide a network planning system that utilizes goal-based routing to generate a network plan. The network planning system may remove a route for a previously routed traffic requirement in order to route a new or current traffic requirement, and may then establish a goal of determining a new route for the removed route. The determination of the new route may further remove routes for additional traffic requirements, and the network planning system may establish additional goals of determining new routes for the additional traffic requirements until routes are determined for all of the traffic requirements. The network planning system may assume that equipment and/or portions of equipment are not fixed in place (e.g., that slots for line modules are not fixed and finalized).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, network information associated with a network to be planned,
   the network information including a plurality of traffic requirements for the network;
   identifying, by the device, the plurality of traffic requirements in the network information;
   determining, by the device, a first route in the network for a first traffic requirement of the plurality of traffic requirements, the first route extending between a first line module and a second line module, such that a first multi-wavelength optical signal is transmitted on the first route from the first line module to the second line module;
   determining, by the device, that a second route for a second traffic requirement, of the plurality of traffic requirements, is removed based on the first route for the first traffic requirement, the second route extending between a third line module and a fourth line module, such that the second route is configured to provide a second multi-wavelength optical signal from the third line module to the fourth line module;
   determining, by the device, a third route in the network for the second traffic requirement;
   determining, by the device, additional routes in the network for remaining traffic requirements of the plurality of traffic requirements;
   generating, by the device, a network plan for the network based on the first route, the third route, and the additional routes determined in the network;
   outputting, by the device, the network plan; and
   routing traffic through the network based on the network plan.

2. The method of claim 1, further comprising:
   determining an order for the plurality of traffic requirements; and
   selecting the first traffic requirement based on the order for the plurality of traffic requirements.

3. The method of claim 1, where determining the first route in the network for the first traffic requirement comprises:

attempting to determine the first route in the network for the first traffic requirement with an initial routing process; and if the initial routing process is unable to determine the first route, determining the first route in the network for the first traffic requirement with a goal-based routing process.

4. The method of claim 3, where the initial routing process includes a depth first search (DFS) routing process.

5. The method of claim 1, where the network plan minimizes an amount of equipment to be implemented in the network.

6. The method of claim 1, further comprising:
determining that a fourth route for one of the remaining traffic requirements, of the plurality of traffic requirements, is removed based on one of the additional routes determined for other remaining traffic requirements; and determining a fifth route in the network for the one of the remaining traffic requirements.

7. The method of claim 6, further comprising:
generating the network plan for the network based on the first route, the third route, the fifth route, and the additional routes determined in the network.

8. A device, comprising:
one or more processors to:
receive network information associated with a network to be planned,
the network information including a plurality of traffic requirements for the network;
identify the plurality of traffic requirements in the network information;
allocate a first route in the network for a traffic requirement of the plurality of traffic requirements, the first route extending between a first line module and a second line module, such that a first multi-wavelength optical signal is transmitted on the first route from the first line module to the second line module;
determine that a second route for at least one other traffic requirement, of the plurality of traffic requirements, is removed based on the route for the traffic requirement, the second route extending between a third line module and a fourth line module, such that the second route is configured to provide a second multi-wavelength optical signal from the third line module to the fourth line module;
allocate a third route in the network for the at least one other traffic requirement;
allocate additional routes in the network for remaining traffic requirements of the plurality of traffic requirements;
generate a network plan for the network based on the first route, the third route, and the additional routes allocated in the network;
output or store the network plan; and
routing traffic through the network based on the network plan.

9. The device of claim 8, where the one or more processors are further to:
determine an order for the plurality of traffic requirements; and
randomly select the traffic requirement based on the order for the plurality of traffic requirements;
select a first traffic requirement, as the traffic requirement, based on the order for the plurality of traffic requirements; or select a last traffic requirement, as the traffic requirement, based on the order for the plurality of traffic requirements.

10. The device of claim 8, where, when determining the first route in the network for the traffic requirement, the one or more processors are further to:
attempt to allocate the first route for the traffic requirement with a first routing process; and
if the first routing process is unable to determine the first route, allocate the first route for the traffic requirement with a second routing process, different than the first routing process.

11. The device of claim 10, where the first routing process includes a depth first search (DFS) routing process, and the second routing process includes a goal-based routing process.

12. The device of claim 8, where the network plan minimizes an amount of equipment to be implemented in the network.

13. The device of claim 8, where the one or more processors are further to:
determine that a fourth route for one of the remaining traffic requirements, of the plurality of traffic requirements, is removed based on one of the additional routes determined for other remaining traffic requirements; and
allocate a fifth route in the network for the one of the remaining traffic requirements.

14. The device of claim 13, where the one or more processors are further to:
generate the network plan for the network based on the first route, the third route, the fifth route, and the additional routes allocated in the network.

15. A non-transitory computer-readable medium for storing instructions, the instructions comprising:
one or more instructions that, when executed by one or more processors of a device, cause the one or more processors to:
receive network information associated with a network to be planned,
the network information including a plurality of traffic requirements for the network;
identify the plurality of traffic requirements in the network information;
determine a first route in the network for a first traffic requirement of the plurality of traffic requirements, the first route extending between a first line module and a second line module, such that a first multi-wavelength optical signal is transmitted on the first route from the first line module to the second line module;
determine that a second route for a second traffic requirement, of the plurality of traffic requirements, is removed based on the route for the first traffic requirement, the second route extending between a third line module and a fourth line module, such that the second route is configured to provide a second multi-wavelength optical signal from the third line module to the fourth line module;
determine a third route in the network for the second traffic requirement;
determine that a fourth route for a third traffic requirement, of the plurality of traffic requirements, is removed based on the first route for the second traffic requirement;
determine a fifth route in the network for the third traffic requirement;

determine additional routes in the network for remaining traffic requirements of the plurality of traffic requirements;
generate a network plan for the network based on the first route, the third route, the fifth route, and the additional routes determined in the network;
output or store the network plan; and
routing traffic through the network based on the network plan.

16. The non-transitory computer-readable medium of claim 15, where the one or more instructions further cause the one or more processors to:
   determine an order for the plurality of traffic requirements; and
   select the first traffic requirement based on the order for the plurality of traffic requirements.

17. The non-transitory computer-readable medium of claim 15, where the one or more instructions that cause the one or more processors to determine the first route in the network for the first traffic requirement, further cause the one or more processors to:
   attempt to determine the first route in the network for the first traffic requirement with a first routing process;
   if the first routing process is unable to determine the first route, attempt to determine the first route in the network for the first traffic requirement with a second routing process, different than the first routing process; and
   if the second routing process is unable to determine the first route, generate a notification indicating that the first traffic requirement cannot be routed.

18. The non-transitory computer-readable medium of claim 17, where the first routing process includes a depth first search (DFS) routing process, and the second routing process includes a goal-based routing process.

19. The non-transitory computer-readable medium of claim 15, where the network plan minimizes an amount of equipment to be utilized for building the network.

20. The non-transitory computer-readable medium of claim 15, where the one or more instructions further cause the one or more processors to:
   determine that a sixth route for one of the remaining traffic requirements, of the plurality of traffic requirements, is removed based on one of the additional routes determined for other remaining traffic requirements; and
   determine a seventh route in the network for the one of the remaining traffic requirements.

* * * * *